(12) United States Patent
Wolke et al.

(10) Patent No.: US 12,455,379 B2
(45) Date of Patent: Oct. 28, 2025

(54) CLOUD-TO-CLOUD COMPARISON USING ARTIFICIAL INTELLIGENCE-BASED ANALYSIS

(71) Applicant: FARO Technologies, Inc., Lake Mary, FL (US)

(72) Inventors: Matthias Wolke, Korntal-Münchingen (DE); Georgios Balatzis, Fellbach (DE)

(73) Assignee: FARO Technologies, Inc., Lake Mary, FL (US)

( * ) Notice: Subject to any disclaimer, the term of this patent is extended or adjusted under 35 U.S.C. 154(b) by 996 days.

(21) Appl. No.: 17/533,753

(22) Filed: Nov. 23, 2021

(65) Prior Publication Data

US 2022/0179083 A1 Jun. 9, 2022

Related U.S. Application Data

(60) Provisional application No. 63/121,563, filed on Dec. 4, 2020.

(51) Int. Cl.
*G01S 17/89* (2020.01)
*G06N 3/08* (2023.01)

(52) U.S. Cl.
CPC ............. *G01S 17/89* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 9,599,455 B2 | 3/2017 | Heidemann et al. | |
| 2018/0321383 A1 | 11/2018 | Heidemann et al. | |
| 2021/0350595 A1* | 11/2021 | Zhu | G06T 7/66 |
| 2023/0029302 A1* | 1/2023 | Catana Salazar | G06F 30/27 |

OTHER PUBLICATIONS

Anonymous; "CloudCompare Version 2.6.1—User Manual"; Internet Wayback Machine; Retrieved Online from http://www.cloudcompare.org/doc/qCC/CloudCompare%20v2.6.1%20-%20User%20manual.pdf; Feb. 2015; 181 Pages.
European Search Report Issued in European Application No. 21210561.3-1210 dated May 3, 2022; 15 Pages.

* cited by examiner

*Primary Examiner* — Leon Flores
(74) *Attorney, Agent, or Firm* — McCarter & English, LLP; Dave S. Christensen; Joseph C. Drish

(57) ABSTRACT

Examples described herein provide a method that includes aligning, by a processing device, a measured point cloud for an object with reference data for the object. The method further includes comparing, by the processing device, the measurement point cloud to the reference data to determine a displacement value between each point in the measurement point cloud and a corresponding point in the reference data. The method further includes generating, by the processing device, a deviation histogram of the displacement values between each point in the measurement point cloud and the corresponding point in the reference data. The method further includes identifying, by the processing device, a region of interest of the deviation histogram. The method further includes determining, by the processing device, whether a deviation associated with the object exists based at least in part on the region of interest.

20 Claims, 17 Drawing Sheets
(1 of 17 Drawing Sheet(s) Filed in Color)

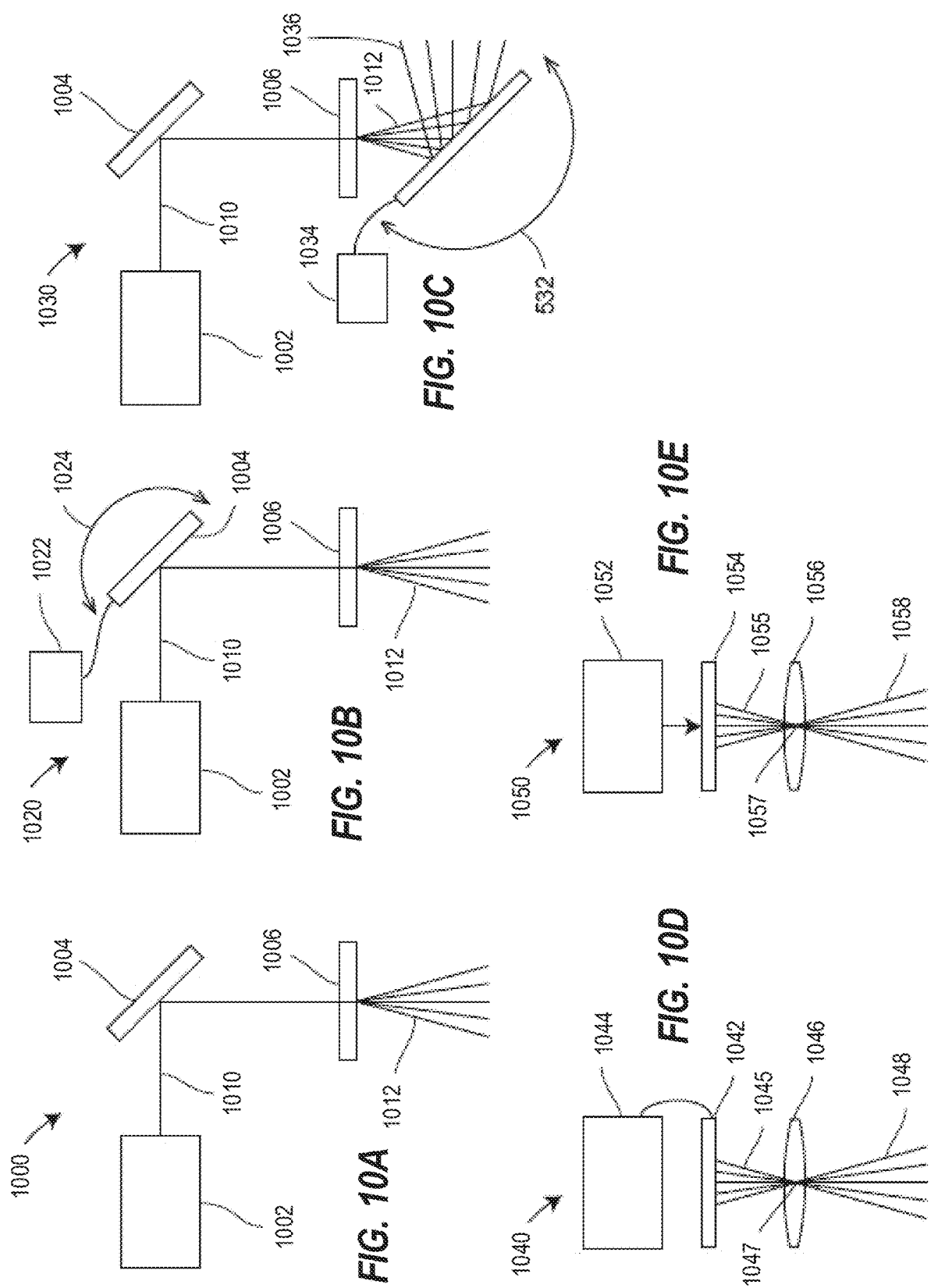

CLOUD-TO-CLOUD COMPARISON USING ARTIFICIAL INTELLIGENCE-BASED ANALYSIS

CROSS-REFERENCE TO RELATED APPLICATIONS

This application claims the benefit of U.S. Provisional Patent Application No. 63/121,563 filed Dec. 4, 2020, the disclosure of which is incorporated herein by reference in its entirety.

BACKGROUND

Embodiments of the present disclosure generally relate to point clouds and, in particular, to techniques for performing a cloud-to-cloud comparison of point clouds using an artificial intelligence-based analysis.

The acquisition of three-dimensional coordinates of an object or an environment is known. Various techniques may be used, such as time-of-flight (TOF) or triangulation methods, for example. A TOF system such as a laser tracker, for example, directs a beam of light such as a laser beam toward a retroreflector target positioned over a spot to be measured. An absolute distance meter (ADM) is used to determine the distance from the distance meter to the retroreflector based on the length of time it takes the light to travel to the spot and return. By moving the retroreflector target over the surface of the object, the coordinates of the object surface may be ascertained. Another example of a TOF system is a laser scanner that measures a distance to a spot on a diffuse surface with an ADM that measures the time for the light to travel to the spot and return. TOF systems have advantages in being accurate, but in some cases may be slower than systems that project a pattern such as a plurality of light spots simultaneously onto the surface at each instant in time.

In contrast, a triangulation system, such as a scanner, projects either a line of light (e.g., from a laser line probe or a line scanner), a pattern of light (e.g., from a structured light), or sweeps a spot of light onto the surface. In this system, a camera is coupled to a projector in a fixed mechanical relationship. The light/pattern emitted from the projector is reflected off of the surface and detected by the camera. Since the camera and projector are arranged in a fixed relationship, the distance to the object may be determined from captured images using trigonometric principles. Triangulation systems provide advantages in quickly acquiring coordinate data over large areas.

In some systems, during the scanning process, the scanner acquires, at different times, a series of images of the patterns of light formed on the object surface. These multiple images are then registered relative to each other so that the position and orientation of each image relative to the other images are known. Where the scanner is handheld, various techniques have been used to register the images. One common technique uses features in the images to match overlapping areas of adjacent image frames. This technique works well when the object being measured has many features relative to the field of view of the scanner. However, if the object contains a relatively large flat or curved surface, the images may not properly register relative to each other.

Accordingly, while existing three-dimensional (3D) scanners are suitable for their intended purposes, what is needed is a 3D scanner having certain features of embodiments of the present invention.

SUMMARY

Embodiments of the present invention are directed to performing a cloud-to-cloud comparison of point clouds using an artificial intelligence-based analysis.

A non-limiting example computer-implemented method includes aligning, by a processing device, a measured point cloud for an object with reference data for the object. The method further includes comparing, by the processing device, the measurement point cloud to the reference data to determine a displacement value between each point in the measurement point cloud and a corresponding point in the reference data. The method further includes generating, by the processing device, a deviation histogram of the displacement values between each point in the measurement point cloud and the corresponding point in the reference data. The method further includes identifying, by the processing device, a region of interest of the deviation histogram. The method further includes determining, by the processing device, whether a deviation associated with the object exists based at least in part on the region of interest.

In addition to one or more of the features described herein, or as an alternative, further embodiments of the method may include that aligning the reference data with the measured point cloud is based on a feature or a marker within the reference data.

In addition to one or more of the features described herein, or as an alternative, further embodiments of the method may include evaluating, by the processing device, normals of each point of the measured point cloud and generalizing each point to vector fields.

In addition to one or more of the features described herein, or as an alternative, further embodiments of the method may include acquiring, using a three-dimensional scanner, the measurement point cloud.

In addition to one or more of the features described herein, or as an alternative, further embodiments of the method may include that the reference data is a reference point cloud.

In addition to one or more of the features described herein, or as an alternative, further embodiments of the method may include that the reference data is a computer-aided design model.

In addition to one or more of the features described herein, or as an alternative, further embodiments of the method may include that the reference data is scan data of a scanned golden part.

In addition to one or more of the features described herein, or as an alternative, further embodiments of the method may include that performing the comparison includes performing a multi-scale model-to-model cloud comparison.

A non-limiting example computer-implemented method includes training a neural network to identify a deformity associated with an object. The method further includes aligning, by a processing device, a measured point cloud for an object with reference data for the object. The method further includes comparing, by the processing device, the measurement point cloud to the reference data to determine a displacement value between each point in the measurement point cloud and a corresponding point in the reference data. The method further includes generating, by the processing device, a deviation histogram of the displacement values between each point in the measurement point cloud and the corresponding point in the reference data. The method further includes determining, by the processing device using the neural network, a deviation associated with the object based at least in part on the deviation histogram.

In addition to one or more of the features described herein, or as an alternative, further embodiments of the method may include classifying, by the processing device using the neural network, a type of the deviation associated with the object.

In addition to one or more of the features described herein, or as an alternative, further embodiments of the method may include generating, by the processing device, a colored point cloud based at least in part on the deviation histogram.

In addition to one or more of the features described herein, or as an alternative, further embodiments of the method may include that determining the deviation is based at least in part on the colored point cloud.

In addition to one or more of the features described herein, or as an alternative, further embodiments of the method may include that determining the deviation is based at least in part on red-blue-green values.

In addition to one or more of the features described herein, or as an alternative, further embodiments of the method may include that the reference data is a three-dimensional (3D) point cloud.

In addition to one or more of the features described herein, or as an alternative, further embodiments of the method may include that the reference data is a two-dimensional (2D) image of a 3D point cloud.

In addition to one or more of the features described herein, or as an alternative, further embodiments of the method may include that determining the deviation includes identifying, by the processing device using the neural network, a problem region in the measurement point cloud.

In addition to one or more of the features described herein, or as an alternative, further embodiments of the method may include that the point cloud is a three-dimensional (3D) point cloud.

In addition to one or more of the features described herein, or as an alternative, further embodiments of the method may include transforming, by the processing device, the 3D point cloud into a 2.5-dimensional (2.5D) matrix.

In another exemplary embodiment a system includes a memory having computer readable instructions. The system further includes a processing device for executing the computer readable instructions, the computer readable instructions controlling the processing device to perform operations. The operations include training a neural network to identify a deformity associated with an object. The operations further include aligning, by a processing device, a measured point cloud for an object with reference data for the object. The operations further include comparing, by the processing device, the measurement point cloud to the reference data to determine a displacement value between each point in the measurement point cloud and a corresponding point in the reference data. The operations further include generating, by the processing device, a deviation histogram of the displacement values between each point in the measurement point cloud and the corresponding point in the reference data. The operations further include determining, by the processing device using the neural network, a deviation associated with the object based at least in part on the deviation histogram.

In addition to one or more of the features described herein, or as an alternative, further embodiments of the system may include that the instructions further include classifying, by the processing device using the neural network, a type of the deviation associated with the object.

In addition to one or more of the features described herein, or as an alternative, further embodiments of the system may include that the instructions further include generating, by the processing device, a colored point cloud based at least in part on the deviation histogram.

In addition to one or more of the features described herein, or as an alternative, further embodiments of the system may include that determining the deviation is based at least in part on the colored point cloud.

In addition to one or more of the features described herein, or as an alternative, further embodiments of the system may include that determining the deviation is based at least in part on red-blue-green values.

In addition to one or more of the features described herein, or as an alternative, further embodiments of the system may include that the reference data is a three-dimensional (3D) point cloud.

In addition to one or more of the features described herein, or as an alternative, further embodiments of the system may include that the reference data is a two-dimensional (2D) image of a 3D point cloud.

In addition to one or more of the features described herein, or as an alternative, further embodiments of the system may include that determining the deviation comprises identifying, by the processing device using the neural network, a problem region in the measurement point cloud.

In addition to one or more of the features described herein, or as an alternative, further embodiments of the system may include that the point cloud is a three-dimensional (3D) point cloud.

In addition to one or more of the features described herein, or as an alternative, further embodiments of the system may include that the instructions further include transforming, by the processing device, the 3D point cloud into a 2.5-dimensional (2.5D) matrix.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter, which is regarded as the invention, is particularly pointed out and distinctly claimed in the claims at the conclusion of the specification. The foregoing and other features, and advantages of embodiments of the invention are apparent from the following detailed description taken in conjunction with the accompanying drawings in which:

FIGS. 10A, 10B, 10C, 10D, 10E are schematic diagrams illustrating different types of projectors according to one or more embodiments described herein;

DETAILED DESCRIPTION

The technical solutions described herein generally relate to techniques for performing a cloud-to-cloud comparison of point clouds using an artificial intelligence-based analysis. Point clouds can be captured by a three-dimensional (3D) coordinate scanning device or "scanner", such as that depicted in FIG. 1.

Figure 1:
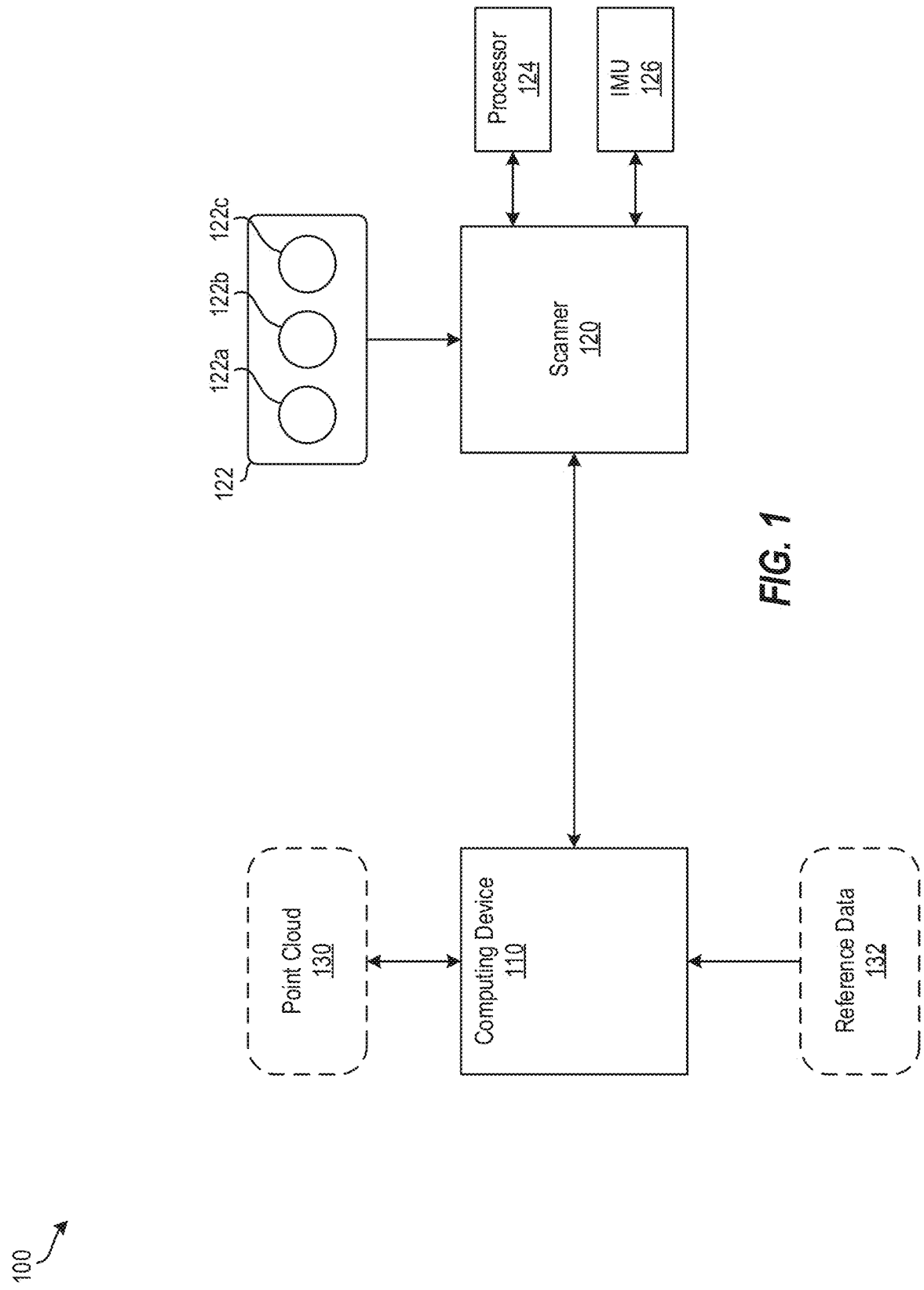
FIG. 1 depicts a system for scanning an environment according to one or more embodiments described herein.

In particular, FIG. 1 depicts a system 100 for scanning an environment according to one or more embodiments described herein. The system 100 includes a computing device 110 coupled with a scanner 120, which can be a 3D scanner or another suitable scanner. The coupling facilitates wired and/or wireless communication between the computing device 110 and the scanner 120. The scanner 120 includes a set of sensors 122. The set of sensors 122 can include different types of sensors, such as LIDAR sensor 122A (light detection and ranging), RGB-D camera 122B (red-green-blue-depth), and wide-angle/fisheye camera 122C, and other types of sensors. The scanner 120 can also include an inertial measurement unit (IMU) 126 to keep track of a 3D movement and orientation of the scanner 120. The scanner 120 can further include a processor 124 that, in turn, includes one or more processing units. The processor 124 controls the measurements performed using the set of sensors 122. In one or more examples, the measurements are performed based on one or more instructions received from the computing device 110. In an embodiment, the LIDAR sensor 122A is a two-dimensional (2D) scanner that sweeps a line of light in a plane (e.g. a plane horizontal to the floor).

According to one or more embodiments described herein, the scanner 120 is a dynamic machine vision sensor (DMVS) scanner manufactured by FARO® Technologies, Inc. of Lake Mary, Florida, USA. DMVS scanners are discussed further with reference to FIGS. 11A☐18. In an embodiment, the scanner 120 may be that described in commonly owned United States Patent Publication 2018/0321383 entitled Triangulation Scanner having Flat Geometry and Projecting Uncoded Spots, the contents of which are incorporated by reference herein. It should be appreciated that the techniques described herein are not limited to use with DMVS scanners and that other types of 3D scanners can be used, such as but not limited to a time-of-flight scanner, a laser line or line scanner, or a structured light scanner for example.

The computing device 110 can be a desktop computer, a laptop computer, a tablet computer, a phone, or any other type of computing device that can communicate with the scanner 120. In examples, the computing device 110 can include hardware and/or software suitable for executing instructions. For example, the features and functionality described herein can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the features and functionality described herein (such as the methods 200 and 300) can be implemented as a combination of hardware and programming. The programming can be processor executable instructions stored on a tangible memory, and the hardware can include a processing device (not shown) for executing those instructions. Thus a system memory (not shown) can store program instructions that when executed by the processing device implement the features and functionality described herein.

In one or more embodiments, the computing device 110 generates a point cloud 130 (e.g., a 3D point cloud) of the environment being scanned by the scanner 120 using the set of sensors 122. The point cloud 130 is a set of data points (i.e., a collection of three-dimensional coordinates) that correspond to surfaces of objects in the environment being scanned and/or of the environment itself. According to one or more embodiments described herein, a display (not shown) displays a live view of the point cloud 130.

As noted earlier, the scanner 120, along with capturing the point cloud 130, is also locating itself within the environment. In an embodiment, the scanner 120 uses odometry, which includes using data from motion or visual sensors to estimate the change in position of the scanner 120 over time. Odometry is used to estimate the position of the scanner 120 relative to a starting location. This method is sensitive to errors due to the integration of velocity measurements over time to give position estimates, which generally applies to odometry from inertial measurements. In other embodiments, the scanner 120 estimates its position based only on visual sensors.

A common task in quality control or maintenance is to detect deformations on objects. This can be achieved by repetitive measurements of a single object or a single measurement of several geometrically identical objects. The measurements provide a 3D point cloud of the object and a deformation can be detected by comparing the 3D point cloud of a given measurement with a 3D point cloud of another measurement that is known to be without defects (referred to as a "reference point cloud" or "golden point cloud").

For example, 3D point cloud analysis can be performed by comparing 3D measurement data (e.g., the point cloud 130) to reference data 132. The reference data 132 can be a computer-aided design (CAD) model or a measurement of a so-called "golden part." From this comparison (between the 3D measurement data (e.g., the point cloud 130) and the reference data 132), information about defects or discrepancies in the measurement data can be extracted. Such defects or discrepancies can indicate a dislocated part, a deformation (e.g., a dent or large scratch), or even a missing part of an object.

Although some techniques exist for performing basic point cloud-to-point cloud (or "cloud-to-cloud") comparison and/or point cloud-to-CAD model comparison, these approaches operate by comparing single points. For example, a technique (known as "multiscale model-to-model cloud comparison" or "M3C2") for detecting a deformation on an object is to align a reference point cloud (e.g., the reference data 132) with a measured point cloud (e.g., the point cloud 130) for the object and to compute a point-per-point distance between those two point clouds. In an example, the measured point cloud is obtained by scanning the object, such as using the scanner 120 or another suitable scanner, such as a triangulation scanner 601 of FIG. 6A.

To detect a defect or deformation, the result of the comparison is evaluated. In an ideal case, a defect or deformation can be identified by the occurrence of deviations above a certain threshold. As described herein, deviations can include deviations, defects, dints, and other irregularities on the surface of an object. However, in reality, the identification of a defect or deformation is more complex due to noise in the data, incomplete data, and/or uneven data. Particularly, all measurement data is noisy. In some cases, such as when using the triangulation scanner 601 of FIG. 6A, a 2-sigma noise of approximately 500 μm at 0.5 m measurement distance may be present. Often there is a requirement to detect small defects or deformations that are not clearly distinct from the noise. Although some approaches exist to smooth data so that small deformations may be detected, such approaches alter the data and the result may depend on the filter settings of the smoothing algorithm applied. Altering the data causes edges and other high-frequency features to be deformed after smoothing. Further, when the measurement data is noisy (i.e., the noise is comparable to the expected/needed sensitivity in the comparison), false-positive detections are likely to be frequent while a high number of true defects go undetected.

Further, due to imperfections in the measurement process, the point cloud 130 may have areas that are better covered (e.g. great than or equal to a desired data density) than other areas. That is, data density may vary in different areas of the object. For example, some parts of the surface of the object may not be covered at all. Different measurements could have, for example, missing surface parts at different locations, which would result in a harder to interpret cloud-to-cloud comparison.

Figure 2:
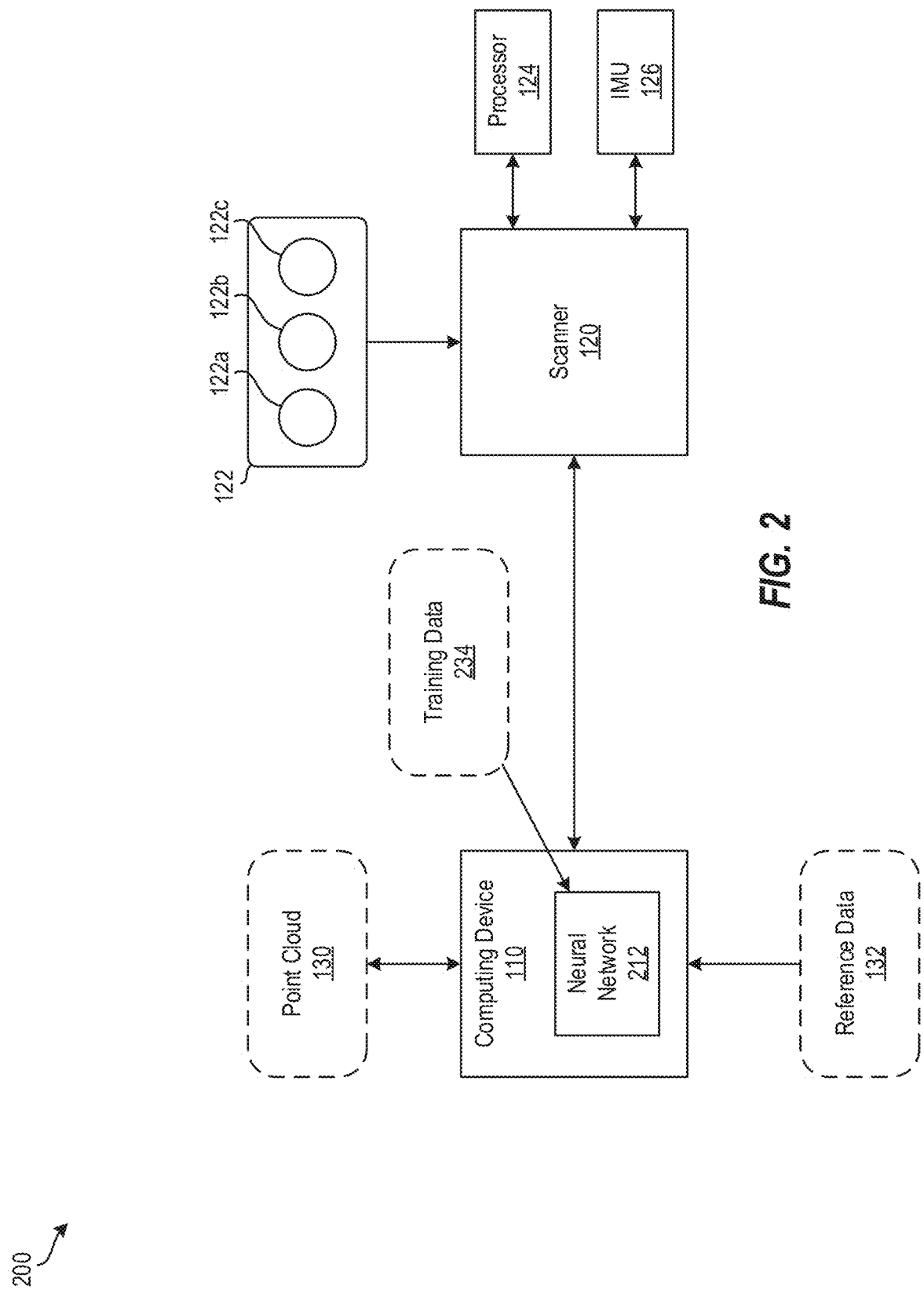
FIG. 2 depicts the system of FIG. 1 including a neural network for performing a cloud-to-cloud comparison of point clouds according to one or more embodiments described herein.

To address these and other shortcomings of the prior art, one or more embodiments described herein provide for performing a cloud-to-cloud comparison of point clouds using an artificial intelligence-based analysis. To do this, the present techniques use artificial intelligence to identify distortions in a histogram of displacement distances determined using a cloud-to-cloud comparison. For example, FIG. 2 depicts a system 200 featuring the computing device 110 of FIG. 1 with the addition of a neural network 212, which can be trained to perform a cloud-to-cloud comparison of point clouds. The results of the analysis provide a binary determination of whether a defect or deformation is detected and further provide information about the defect or deformation (e.g., direction, amount of displacement, etc.).

The one or more embodiments described herein provide numerous technical advantages over the prior art. For example, displaced point cloud segments with a sensitivity below typical measurement noise can be detected. Additionally, data does not need to be smoothed as in conventional approaches, which avoids deformation typically associated with conventional point cloud filtering approaches.

The embodiments of the present disclosure, facilitate improvement to computing technology, and particularly to techniques used for scanning an environment using 3D scanners and then evaluating the scanned data. For example, the present techniques evaluate point cloud data generated by a 3D scanner to determine defects and/or displacements of an object. Such defects and/or displacements may not be observable to a human observer because they are too small to detect with the human eye, for example, or cannot be observed in data because the data is noisy to the same or similar order of magnitude as the defect/displacement. By performing the described cloud-to-cloud comparisons, defects and/or displacements that are otherwise undetectable by human visual inspections or in noisy measurement data can be detected. This improves computing technology and further represents a practical application that facilitates object evaluation.

Figure 3:
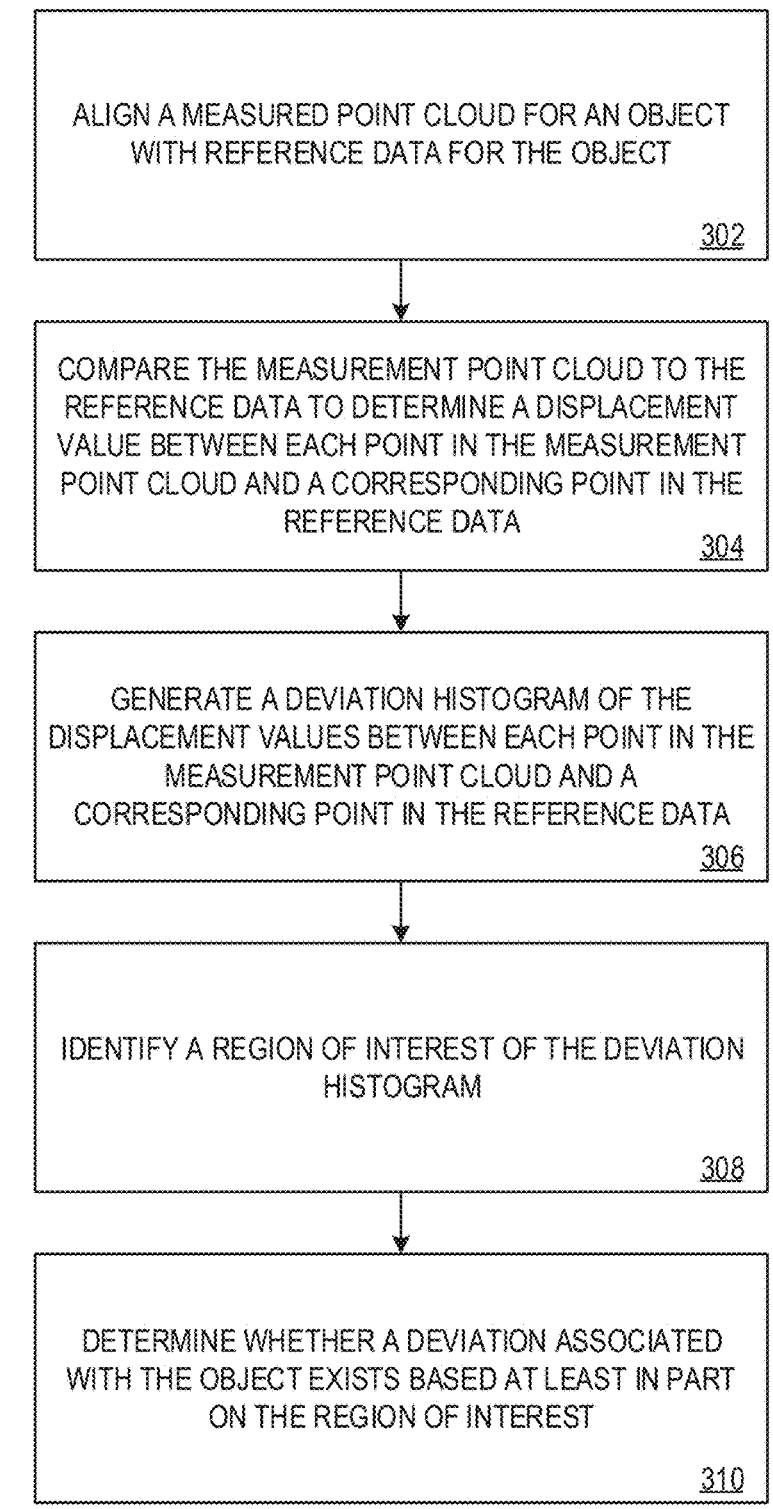
FIG. 3 depicts a flow diagram of a method for performing a cloud-to-cloud comparison of point clouds according to one or more embodiments described herein.

FIG. 3 depicts a flow diagram of a method 300 for performing a cloud-to-cloud comparison of point clouds according to one or more embodiments described herein. The method 300 can be performed by any suitable processing system or device, such as the computing device 110 for example. The method 300 is now described with respect to FIGS. 2 and 5 for exemplary purposes.

At block 302, the computing device 110 performs an alignment of a measured point cloud (e.g., the point cloud 130) for an object with reference data (e.g., the reference data 132) for the object. The reference data can be a computer-aided-design model or a golden master point cloud for example. According to an example, aligning the reference data with a measured point cloud is based on a feature or a marker within the reference data.

At block 304, the computing device 110 compares the measurement point cloud to the reference data to determine a displacement value between each point in the measurement point cloud and a corresponding point in the reference data. The displacement value represents a distance between a reference point in the reference data and a measured point in the measured point cloud. In some examples, the comparison is (or includes) a multi-scale model-to-model cloud comparison.

Figure 5:
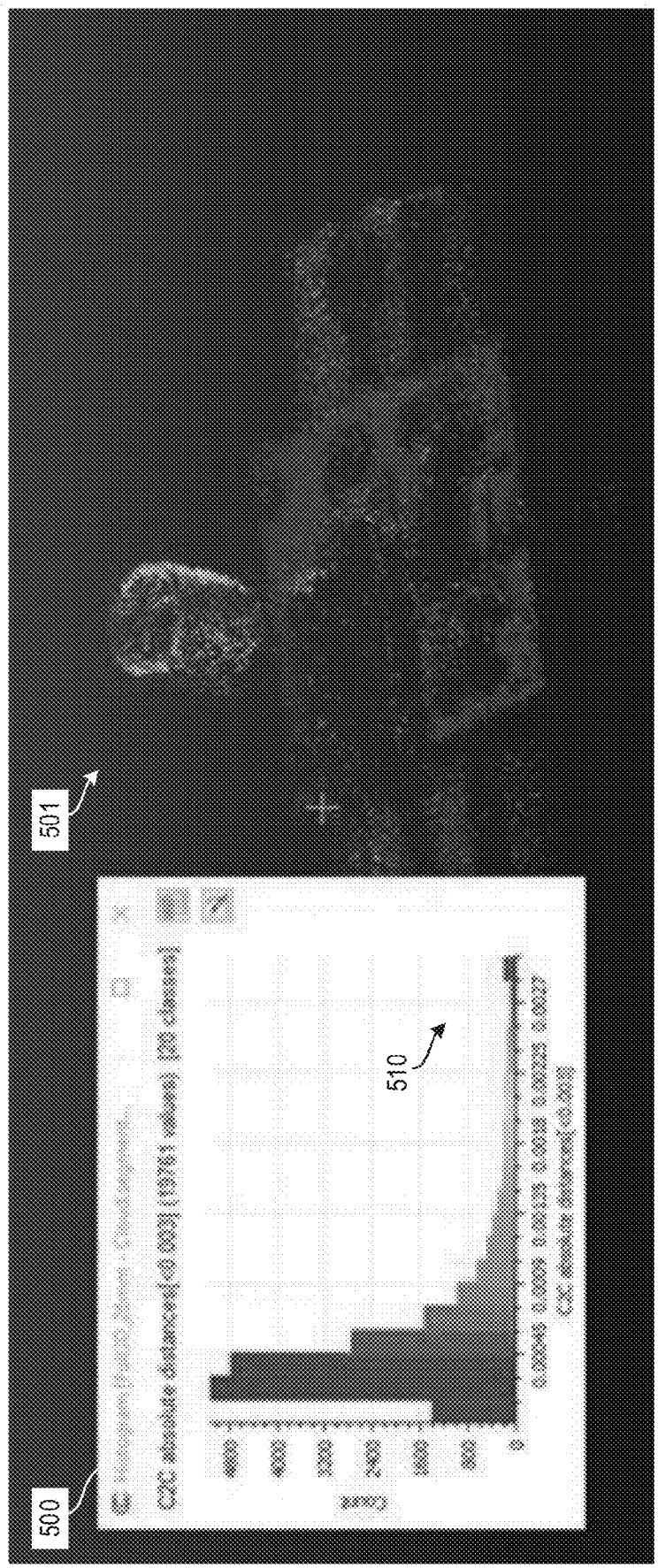
FIG. 5 depicts a deviation histogram and a colored point cloud 501 according to one or more embodiments described herein.

At block 306, the computing device 110 generates a deviation histogram of the displacement values between each point (i.e., the measured points) in the measured point cloud and a corresponding point (i.e., the corresponding reference point) in the reference data. FIG. 5 depicts an example of a deviation histogram 500 according to one or more embodiments described herein. As shown in FIG. 5, the deviation histogram 500 plots the deviation distances (labeled "C2C (cloud-to-cloud) absolute distances" compared to a number (count) of each of those distances.

With continued reference to FIG. 3, at block 308, the computing device 110 identifies a region of interest of the deviation histogram. Regions of interest (or "problem regions") are identified by combining (or binning) several histogram bins based on their location to a peak/valley, signed absolute deviation, etc. Each of these bins can be translated into another tag for each 3D point in the bin. Hence, the distribution of these bins can be analyzed in 3D space where access to neighbor information is available. Since the deviation points are put into specific bins, they can be isolated by excluding other pints with a lower (or non-existent) deviation in the same spatial region. This will result in small dumps of deviated points.

The identified (and, in some examples, cleaned) 3D points are attributed with either the determined displacement values or a tag from a larger deviation bin. This can be treated as a graph, and graph theory operations can be applied thereto. For example, a fast minimum cut algorithm can be applied on the measured point cloud so that groups of points can be isolated. An algorithmic approach can then be performed to look at each point sequentially and compare its distance and movement trend towards its corresponding point in the reference data to determine whether a deviation exists. Particularly, at block 310, the computing device determines whether a deviation associated with the object exists based at least in part on the region of interest. In such a scenario, morphology groups are predefined so that the algorithm can classify a type of anomaly (deformation, defect, etc.) on the object by taking into account the region of points and their average movement trend in one direction.

Consider the following example. A possible result after performing the minimum cut algorithm is a partially isolated point cloud. Since the corresponding points in the reference data are known, the normal of each point can be evaluated by generalizing them into vector fields. The deviation can then be classified for this sub-point cloud. Morphology groups may be identical or similar even that each point cloud can be viewed as a vector field on a plane or surface. Thus, a dent always looks like an inverted bell or valley. This directs that the vectors in a large scale will have the same direction, a turning point, and an inverted direction to the other vectors. Many deviations can be mapped to morphologies, which can be generalized by a mathematical formula for that vector field.

Figure 6A:
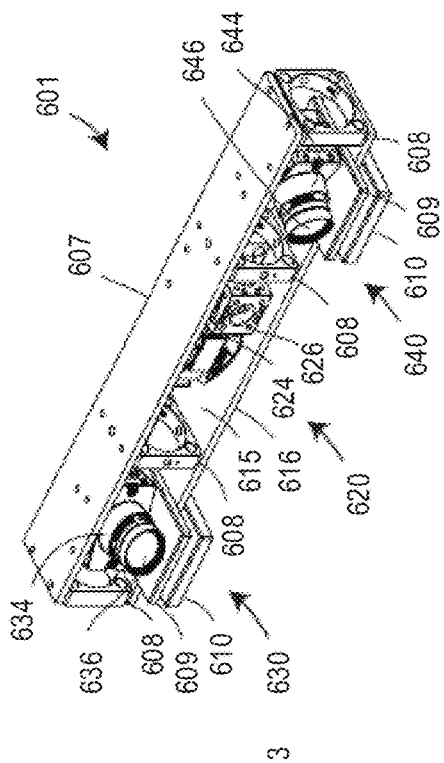
FIGS. 6A, 6B, 6C, 6D, 6E are isometric, partial isometric, partial top, partial front, and second partial top views, respectively, of a triangulation scanner according to one or more embodiments described herein.
Figure 6B:
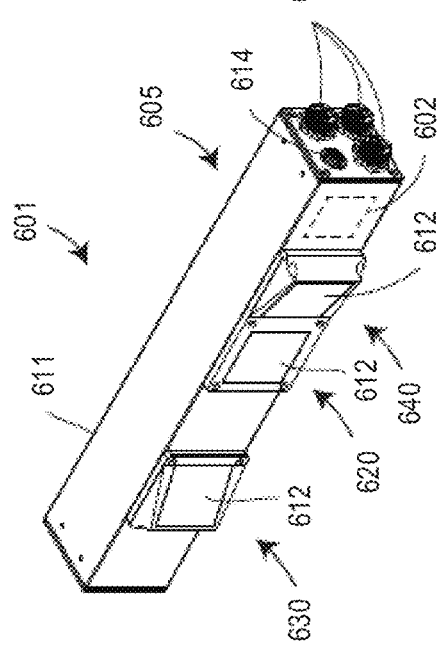

Continuing with this example, if a plane is scanned with a scanner such as the triangulation scanner 601 of FIG. 6A, the vector field (or points trend) should mostly have the same direction. If a deviation analysis is performed (i.e., the method 300) by cutting out points that are not relevant, and performing an minimum cut technique, a clusters of candidate points for defects are returned. Assuming morphology classes have been defined, looking at each point cloud isolated and performing a similar feature analysis to "morphology functions", it can be determined which kind of defect(s) exist in a certain point cloud.

Additional processes also may be included. For example, the method 300 may include evaluating normals of each point of the measured point cloud and generalizing each point to vector fields. In another example, using a three-dimensional scanner such as the triangulation scanner 601 of FIG. 6A, the measurement point cloud can be acquired. It should be understood that the process depicted in FIG. 3 represents an illustration, and that other processes may be added or existing processes may be removed, modified, or rearranged without departing from the scope of the present disclosure.

Figure 4:
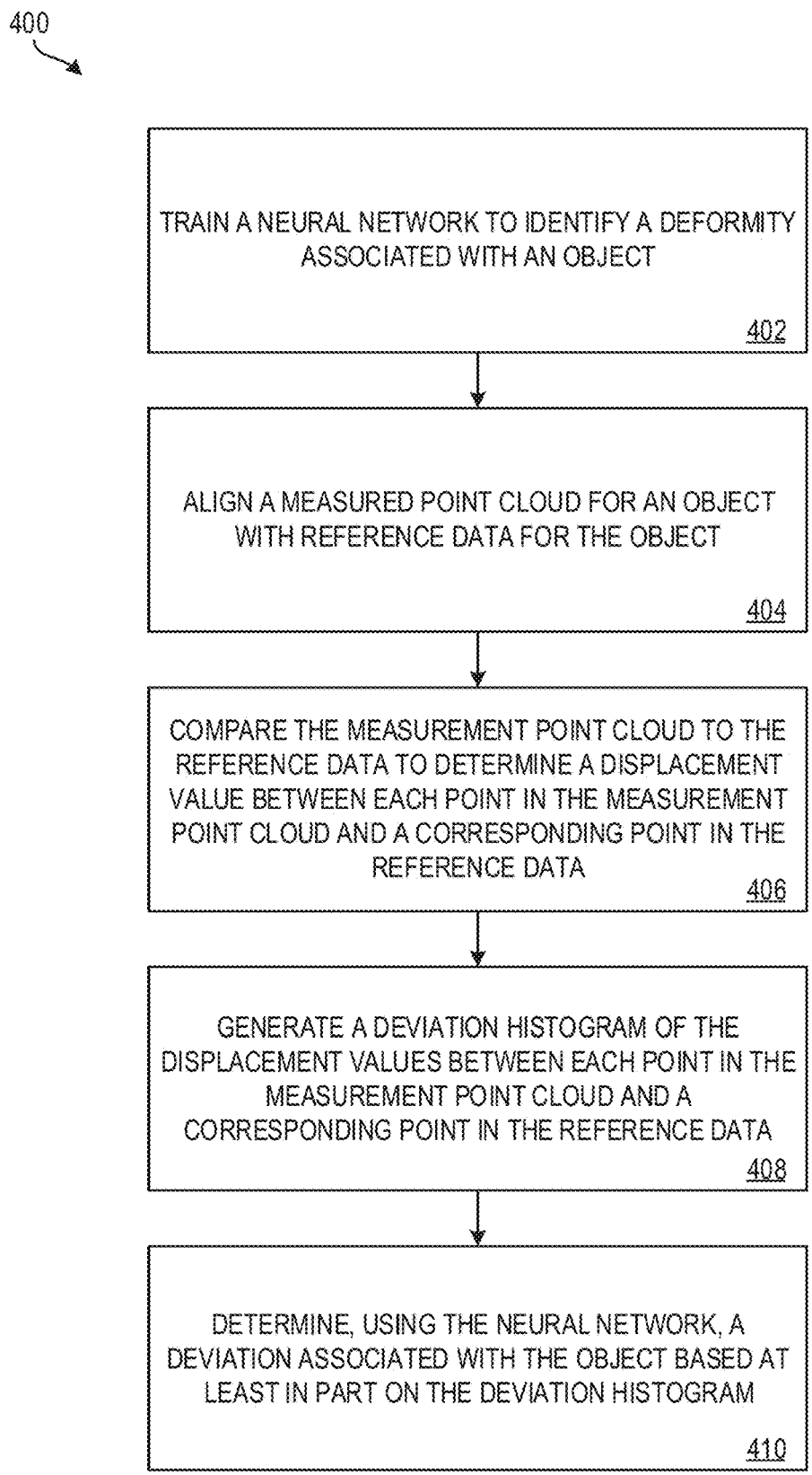
FIG. 4 depicts a flow diagram of a method for training a neural network for performing a cloud-to-cloud comparison of point clouds according to one or more embodiments described herein.

FIG. 4 depicts a flow diagram of a method 400 for training a neural network for performing a cloud-to-cloud comparison of point clouds according to one or more embodiments described herein. The method 400 can be performed by any suitable processing system or device, such as the computing device 110 for example. The method 400 is now described with respect to FIGS. 2 and 5 for exemplary purposes.

In the case of the method 400, artificial intelligence is used to analyze the histogram to identify regions of interest and to identify deviating candidates. As described herein, a neural network can be trained to analyze the histogram and/or to conduct on-the-fly identification of noise or damage/deviations to the object. More specifically, the present techniques can incorporate and utilize rule-based decision making and artificial intelligence (AI) reasoning to accomplish the various operations described herein. The phrase "machine learning" broadly describes a function of electronic systems that learn from data. A machine learning system, engine, or module can include a trainable machine learning algorithm that can be trained, such as in an external cloud environment, to learn functional relationships between inputs and outputs that are currently unknown, and the resulting model can be used for determining whether a deviation exists on or in an object. In one or more embodiments, machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANN that are particularly useful at analyzing visual imagery.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read. It should be appreciated that these same techniques can be applied in the case of denoising images, which is useful for determining whether a deviation exists on or in an object.

As an example, an AI algorithm uses a linear regression approach, a random forest approach, and/or an evolutionary algorithm approach to identify regions of interest and to identify deviating candidates. Particularly, a neural network can be trained in classifying morphology anomalies. According to one or more embodiments described herein, this can be accomplished either by showing the morphology in 3D to the neural network (reducing the 3D points to 2D colored images) or by letting the algorithm decide which deviations make sense to be groups together according to the algebraic morphology of the histogram.

Consider the example in FIG. 5, in which the portion 510 of the histogram 500 is where the point cloud deviates the most. The points that find themselves in these bins are candidates of being part of a deviating cluster. So the AI algorithm learns that point clouds that have big clusters in these ranges (which would be the opposite in a negative direction) are not acceptable, so the object would be considered to have a deviation or defect. This can be accomplished in the 3D point cloud feeding the AI the properties of each point in the point cloud or by feeding the AI 2D colored images of the point cloud in different poses (to avoid missing parts of the point cloud).

With continued reference to FIG. 4, the method 400 is now described in more detail. At block 402, a neural network (e.g., the neural network 212 of FIG. 2) is trained to identify a deformity associated with an object. The neural network 212 can be trained using training data 234, which, for example, can be pairs of 2D images where each pair of 2D images includes a reference image and an image having a deviation or defect. At block 404, the computing device 110 aligns a measured point cloud (e.g., the point cloud 130) for an object with reference data (e.g., the reference data 132) for the object. At block 406, the computing device 110 compares the measurement point cloud to the reference data to determine a displacement value between each point in the measurement point cloud and a corresponding point in the reference data. At block 408, the computing device 110 generates a deviation histogram (e.g., the deviation histogram 500) of the displacement values between each point in the measurement point cloud and a corresponding point in the reference data. At block 410, the computing device 110, using the neural network 212, determines a deviation associated with the object based at least in part on the deviation histogram.

Additional processes also may be included. For example, the method 400 can include classifying using the neural network, a type of the deviation associated with the object. Example types of deviations include dints, defects, scratches, etc. According to one or more embodiments described herein, the method 400 can also include generating a colored point cloud (e.g., the colored point cloud 501 of FIG. 5) based at least in part on the deviation histogram 500. In such cases, determining the deviation is based at least in part on the colored point cloud 501. For example, the red points of the colored point cloud 501 represent larger deviations than the green points of the colored point cloud 501. In some examples, determining the deviation is based at least in part on red-blue-green values.

It should be understood that the process depicted in FIG. 4 represents an illustration, and that other processes may be added or existing processes may be removed, modified, or rearranged without departing from the scope of the present disclosure.

Further, a machine learning network can be created that is capable of conducting on-the-fly identification of noise and/or damage/deviations to an object itself. Such an approach can function without the use of the reference data and deviation analysis. This can save time in the process and reduce the temporary data created, thereby reducing scanning/computation time and resources. In such cases, 3D points coming from the triangulation scanner 601 of FIG. 6A are mapped to a 2.5D matrix and an architecture is set up for the neural network such that it is trained to identify an entropy rate. The implemented and trained neural network results in a just-in-time plugin that identifies deviations on the surface of an object at the time the scan procedure is finished without additional information. This provides the benefit is that, by classifying afterwards the results, the neural network would not only learn to better classify but would also be faster to alert a user to a deviation.

The transformation from 3D to 2.5D occurs as follows according to one or more embodiments described herein. One or more orientations of the 3D point cloud is selected so that a feature of interest is visible from a fixed vertical viewpoint. The 3D point cloud is projected into a virtual camera located at the fixed vertical viewpoint. The virtual camera has a position and orientation. The virtual camera also has a focal length and a field of view tuned to "see" the feature of interest with desired details. A distance of a projected point to the virtual camera is tracked. This distance can be used to filter the projected points so that only actually visible points are left in the virtual image. The virtual image can then be rastered to form a 2.5D matrix. Spacing of the rastering can be chosen to fit a desired level of detail. If more than one point is projected into one raster, these values may be averaged or chosen by their distance.

Consider the following example. The triangulation scanner 601 of FIG. 6A scans a large sphere that is smooth on the surface but has some scratches and a bump or dent. The generated point cloud is translated into a 2.5D matrix as described herein. Since every point exists in a grid and the height information is the value of the grid cells translated to an opacity value, neural network analysis can then be performed as described herein. The trained neural network (e.g., the neural network 212) can perform feature extraction analysis, where the different features are the anomalies detected by the scan. The positive aspect being the neural network 212 does not really learn the features it this example as in each scan iteration it relearns from the beginning how an object is desired to be. Thus, if a perfect sphere has only a scratch or a dent, it will recognize those as a feature and classify them for the user to see.

Turning now to FIGS. 6A, 6B, 6C, 6D, it may be desired to capture three-dimensional (3D) measurements of objects. For example, the point cloud 130 of FIG. 1 may be captured by the scanner 120. One such example of the scanner 120 is now described. Such example scanner is referred to as a DVMS scanner by FARO®.

Figure 6C:
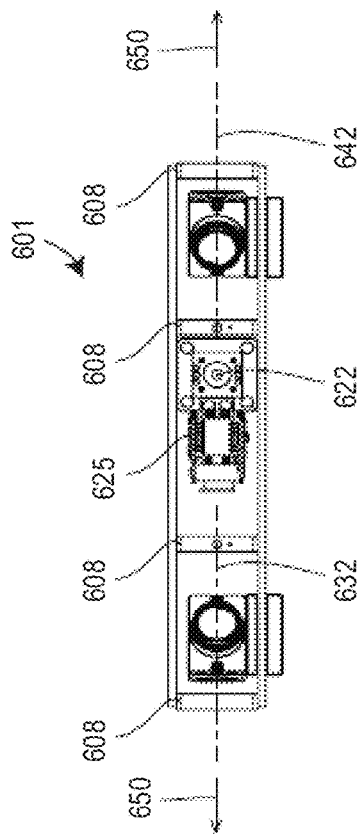
Figure 6D:
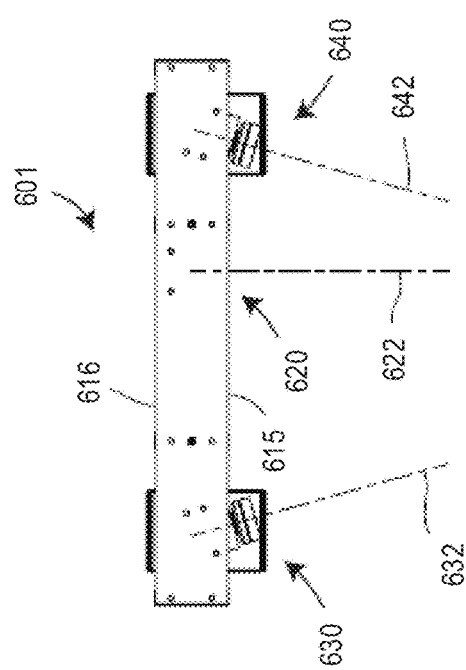

In an embodiment illustrated in FIGS. 6A, 6B, 6C, 6D, 6E, a triangulation scanner 601 includes a body 605, a projector 620, a first camera 630, and a second camera 640. In an embodiment, the projector optical axis 622 of the projector 620, the first-camera optical axis 632 of the first camera 630, and the second-camera optical axis 642 of the second camera 640 all lie on a common plane 650, as shown in FIGS. 6C, 6D. In some embodiments, an optical axis passes through a center of symmetry of an optical system, which might be a projector or a camera, for example. For example, an optical axis may pass through a center of curvature of lens surfaces or mirror surfaces in an optical system. The common plane 650, also referred to as a first plane 650, extends perpendicular into and out of the paper in FIG. 6D.

In an embodiment, the body 605 includes a bottom support structure 606, a top support structure 607, spacers 608, camera mounting plates 609, bottom mounts 610, dress cover 611, windows 612 for the projector and cameras, Ethernet connectors 613, and GPIO connector 614. In addition, the body includes a front side 615 and a back side 616. In an embodiment, the bottom support structure 606 and the top support structure 607 are flat plates made of carbon-fiber composite material. In an embodiment, the carbon-fiber composite material has a low coefficient of thermal expansion (CTE). In an embodiment, the spacers 608 are made of aluminum and are sized to provide a common separation between the bottom support structure 606 and the top support structure 607.

In an embodiment, the projector 620 includes a projector body 624 and a projector front surface 626. In an embodiment, the projector 620 includes a light source 625 that attaches to the projector body 624 that includes a turning mirror and a diffractive optical element (DOE), as explained herein below with respect to FIGS. 10A, 10B, 10C. The light source 625 may be a laser, a superluminescent diode, or a partially coherent LED, for example. In an embodiment, the DOE produces an array of spots arranged in a regular pattern. In an embodiment, the projector 620 emits light at a near infrared wavelength.

In an embodiment, the first camera 630 includes a first camera body 634 and a first-camera front surface 36. In an embodiment, the first camera includes a lens, a photosensitive array, and camera electronics. The first camera 630 forms on the photosensitive array a first image of the uncoded spots projected onto an object by the projector 620. In an embodiment, the first camera responds to near infrared light.

In an embodiment, the second camera 640 includes a second camera body 644 and a second-camera front surface 646. In an embodiment, the second camera includes a lens, a photosensitive array, and camera electronics. The second camera 640 forms a second image of the uncoded spots projected onto an object by the projector 620. In an embodiment, the second camera responds to light in the near infrared spectrum. In an embodiment, a processor 602 is used to determine 3D coordinates of points on an object according to methods described herein below. The processor 602 may be included inside the body 605 or may be external to the body. In further embodiments, more than one processor is used. In still further embodiments, the processor 602 may be remotely located from the triangulation scanner.

Figure 6E:
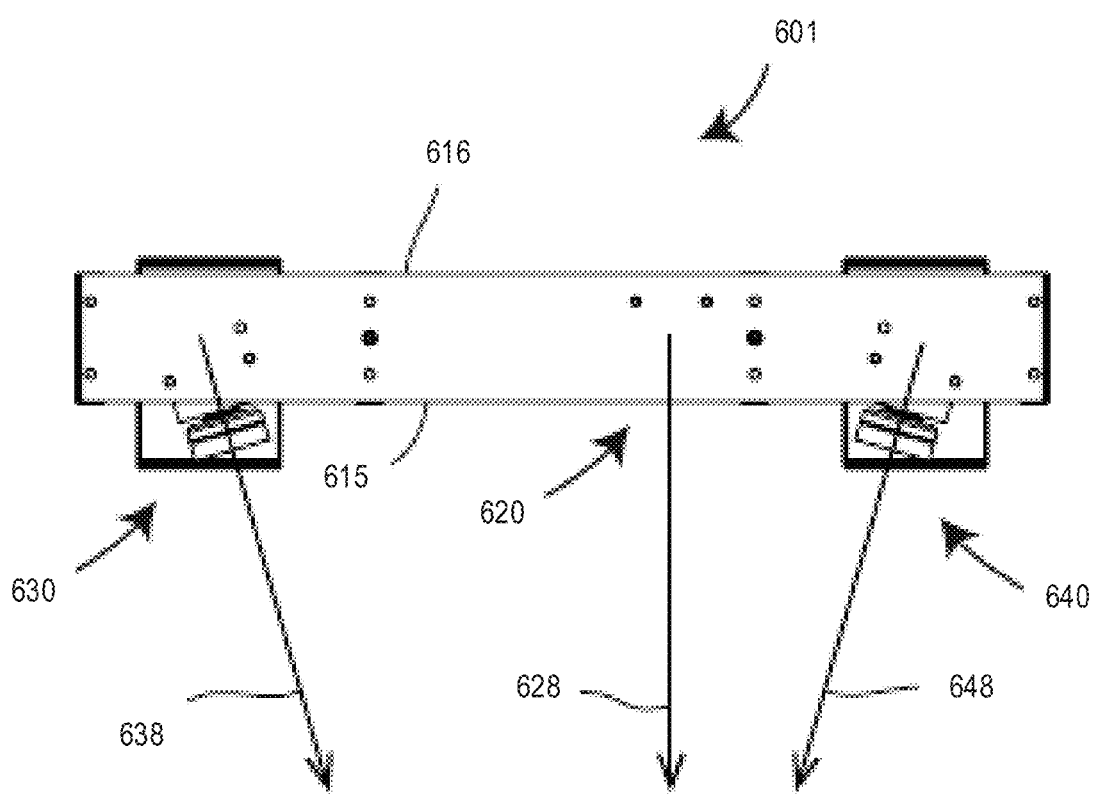

FIG. 6E is a top view of the triangulation scanner 601. A projector ray 628 extends along the projector optical axis from the projector body 624 through the projector front surface 626. In doing so, the projector ray 628 passes through the front side 615. A first-camera ray 638 extends along the first-camera optical axis 632 from the body of the first camera 634 through the first-camera front surface 636. In doing so, the front-camera ray 638 passes through the front side 615. A second-camera ray 648 extends along the second-camera optical axis 642 from the body of the second camera 644 through the second-camera front surface 646. In doing so, the second-camera ray 648 passes through the front side 615.

Figure 7A:
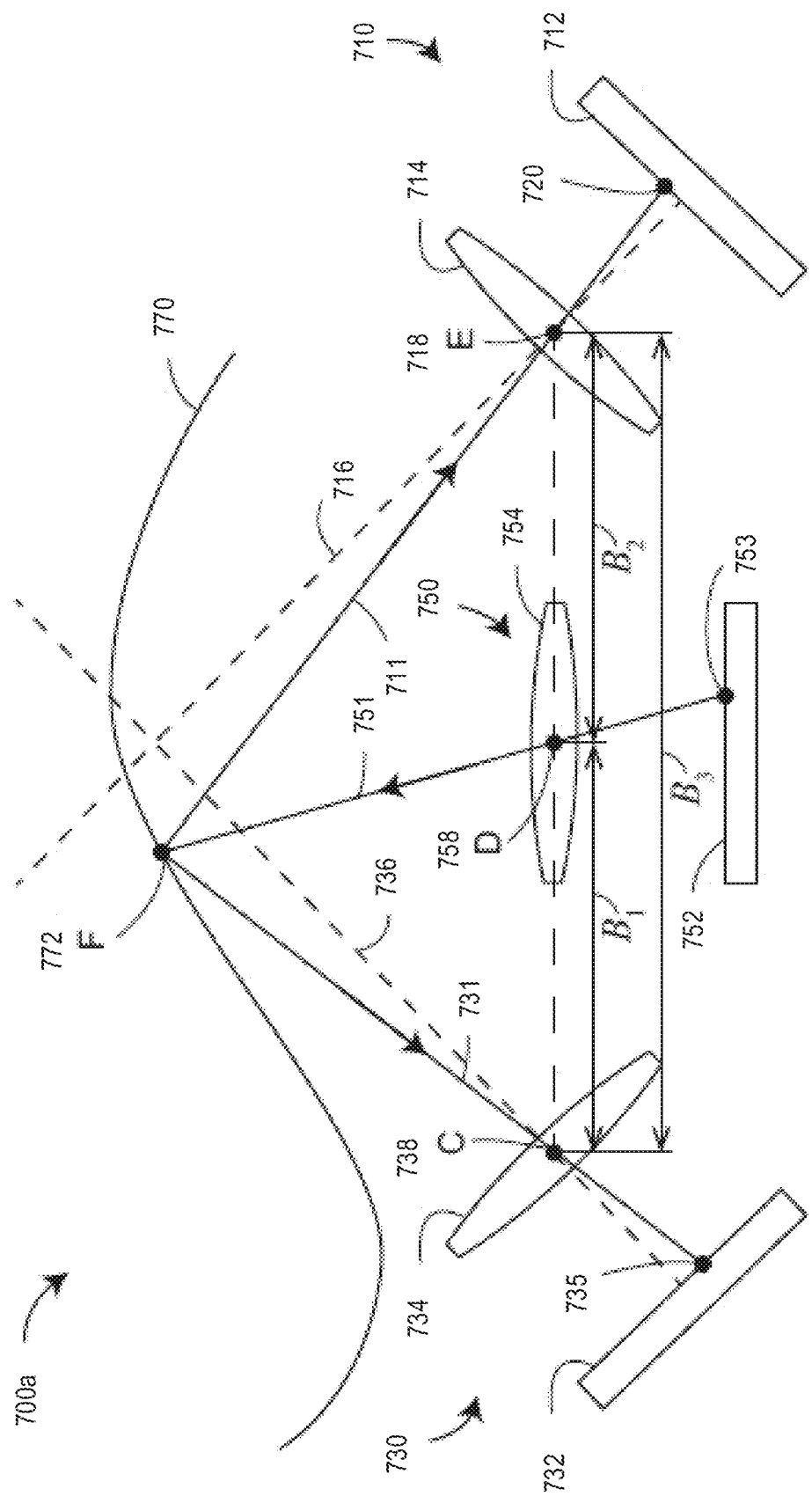
FIG. 7A is a schematic view of a triangulation scanner having a projector, a first camera, and a second camera according to one or more embodiments described herein.

FIG. 7A shows elements of a triangulation scanner 700a that might, for example, be the triangulation scanner 601 shown in FIGS. 6A, 6B, 6C, 6D, 6E. In an embodiment, the triangulation scanner 700a includes a projector 750, a first camera 710, and a second camera 730. In an embodiment, the projector 750 creates a pattern of light on a pattern generator plane 752. An exemplary corrected point 753 on the pattern projects a ray of light 751 through the perspective center 758 (point D) of the lens 754 onto an object surface 770 at a point 772 (point F). The point 772 is imaged by the first camera 710 by receiving a ray of light from the point 772 through the perspective center 718 (point E) of the lens 714 onto the surface of a photosensitive array 712 of the camera as a corrected point 720. The point 720 is corrected in the read-out data by applying a correction value to remove the effects of lens aberrations. The point 772 is likewise imaged by the second camera 730 by receiving a ray of light from the point 772 through the perspective center 738 (point C) of the lens 734 onto the surface of the photosensitive array 732 of the second camera as a corrected point 735. It should be understood that as used herein any reference to a lens includes any type of lens system whether a single lens or multiple lens elements, including an aperture within the lens system. It should be understood that any reference to a projector in this document refers not only to a system projecting with a lens or lens system an image plane to an object plane. The projector does not necessarily have a physical pattern-generating plane 752 but may have any other set of elements that generate a pattern. For example, in a projector having a DOE, the diverging spots of light may be traced backward to obtain a perspective center for the projector and also to obtain a reference projector plane that appears to generate the pattern. In most cases, the projectors described herein propagate uncoded spots of light in an uncoded pattern. However, a projector may further be operable to project coded spots of light, to project in a coded pattern, or to project coded spots of light in a coded pattern. In other words, in some aspects of the disclosed embodiments, the projector is at least operable to project uncoded spots in an uncoded pattern but may in addition project in other coded elements and coded patterns.

In an embodiment where the triangulation scanner 700a of FIG. 7A is a single-shot scanner that determines 3D coordinates based on a single projection of a projection pattern and a single image captured by each of the two cameras, then a correspondence between the projector point 753, the image point 720, and the image point 735 may be obtained by matching a coded pattern projected by the projector 750 and received by the two cameras 710, 730. Alternatively, the coded pattern may be matched for two of the three elements—for example, the two cameras 710, 730 or for the projector 750 and one of the two cameras 710 or 730. This is possible in a single-shot triangulation scanner because of coding in the projected elements or in the projected pattern or both.

After a correspondence is determined among projected and imaged elements, a triangulation calculation is performed to determine 3D coordinates of the projected element on an object. For FIG. 7A, the elements are uncoded spots projected in a uncoded pattern. In an embodiment, a triangulation calculation is performed based on selection of a spot for which correspondence has been obtained on each of two cameras. In this embodiment, the relative position and orientation of the two cameras is used. For example, the baseline distance B3 between the perspective centers 718 and 738 is used to perform a triangulation calculation based on the first image of the first camera 710 and on the second image of the second camera 730. Likewise, the baseline B1 is used to perform a triangulation calculation based on the projected pattern of the projector 750 and on the second image of the second camera 730. Similarly, the baseline B2 is used to perform a triangulation calculation based on the projected pattern of the projector 750 and on the first image of the first camera 710. In an embodiment, the correspondence is determined based at least on an uncoded pattern of uncoded elements projected by the projector, a first image of the uncoded pattern captured by the first camera, and a second image of the uncoded pattern captured by the second camera. In an embodiment, the correspondence is further based at least in part on a position of the projector, the first camera, and the second camera. In a further embodiment, the correspondence is further based at least in part on an orientation of the projector, the first camera, and the second camera.

The term "uncoded element" or "uncoded spot" as used herein refers to a projected or imaged element that includes no internal structure that enables it to be distinguished from other uncoded elements that are projected or imaged. The term "uncoded pattern" as used herein refers to a pattern in which information is not encoded in the relative positions of projected or imaged elements. For example, one method for encoding information into a projected pattern is to project a quasi-random pattern of "dots" in which the relative position of the dots is known ahead of time and can be used to determine correspondence of elements in two images or in a projection and an image. Such a quasi-random pattern contains information that may be used to establish correspondence among points and hence is not an example of a uncoded pattern. An example of an uncoded pattern is a rectilinear pattern of projected pattern elements.

Figure 12B:
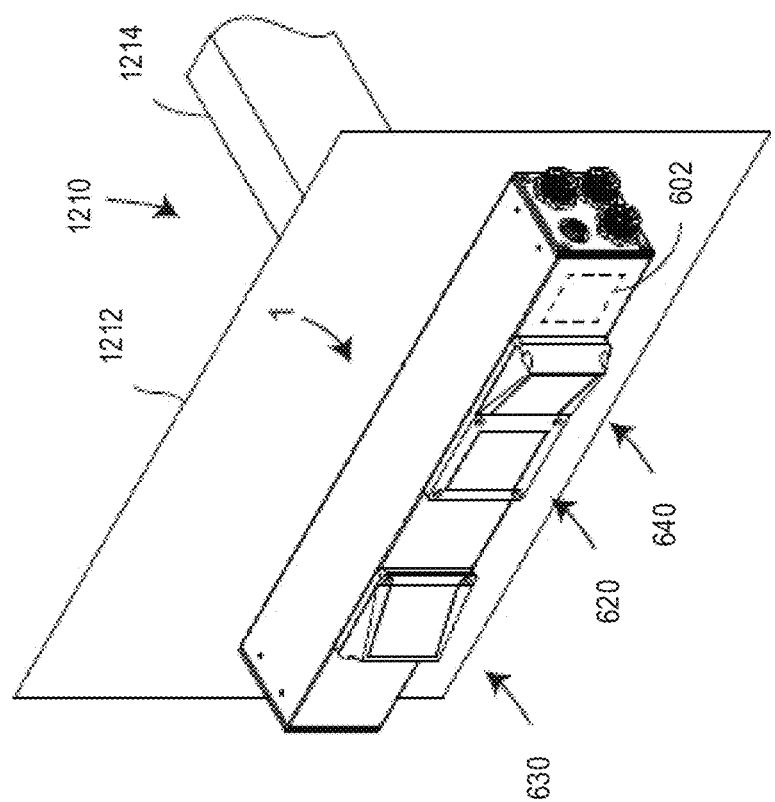
FIG. 12B illustrates a triangulation scanner moved by a robot end effector, according to one or more embodiments described herein.

In an embodiment, uncoded spots are projected in an uncoded pattern as illustrated in the scanner system 7100 of FIG. 12B. In an embodiment, the scanner system 7100 includes a projector 7110, a first camera 7130, a second camera 7140, and a processor 7150. The projector projects an uncoded pattern of uncoded spots off a projector reference plane 7114. In an embodiment illustrated in FIGS. 7B and 7C, the uncoded pattern of uncoded spots is a rectilinear array 7111 of circular spots that form illuminated object spots 7121 on the object 1270. In an embodiment, the rectilinear array of spots 7111 arriving at the object 1270 is modified or distorted into the pattern of illuminated object spots 7121 according to the characteristics of the object 1270. An exemplary uncoded spot 7112 from within the projected rectilinear array 7111 is projected onto the object 1270 as an object spot 7122. The direction from the projector spot 7112 to the illuminated object spot 7122 may be found by drawing a straight line 7124 from the projector spot 7112 on the reference plane 7114 through the projector perspective center 7116. The location of the projector perspective center 7116 is determined by the characteristics of the projector optical system.

In an embodiment, the illuminated object spot 7122 produces a first image spot 7134 on the first image plane 7136 of the first camera 7130. The direction from the first image spot to the illuminated object spot 7122 may be found by drawing a straight line 7126 from the first image spot 7134 through the first camera perspective center 7132. The location of the first camera perspective center 7132 is determined by the characteristics of the first camera optical system.

In an embodiment, the illuminated object spot 7122 produces a second image spot 7144 on the second image plane 7146 of the second camera 7140. The direction from the second image spot 7144 to the illuminated object spot 7122 may be found by drawing a straight line 7126 from the second image spot 7144 through the second camera perspective center 7142. The location of the second camera perspective center 7142 is determined by the characteristics of the second camera optical system.

In an embodiment, a processor 7150 is in communication with the projector 7110, the first camera 7130, and the second camera 7140. Either wired or wireless channels 7151 may be used to establish connection among the processor 7150, the projector 7110, the first camera 7130, and the second camera 7140. The processor may include a single processing unit or multiple processing units and may include components such as microprocessors, field programmable gate arrays (FPGAs), digital signal processors (DSPs), and other electrical components. The processor may be local to a scanner system that includes the projector, first camera, and second camera, or it may be distributed and may include networked processors. The term processor encompasses any type of computational electronics and may include memory storage elements.

Figure 7B:
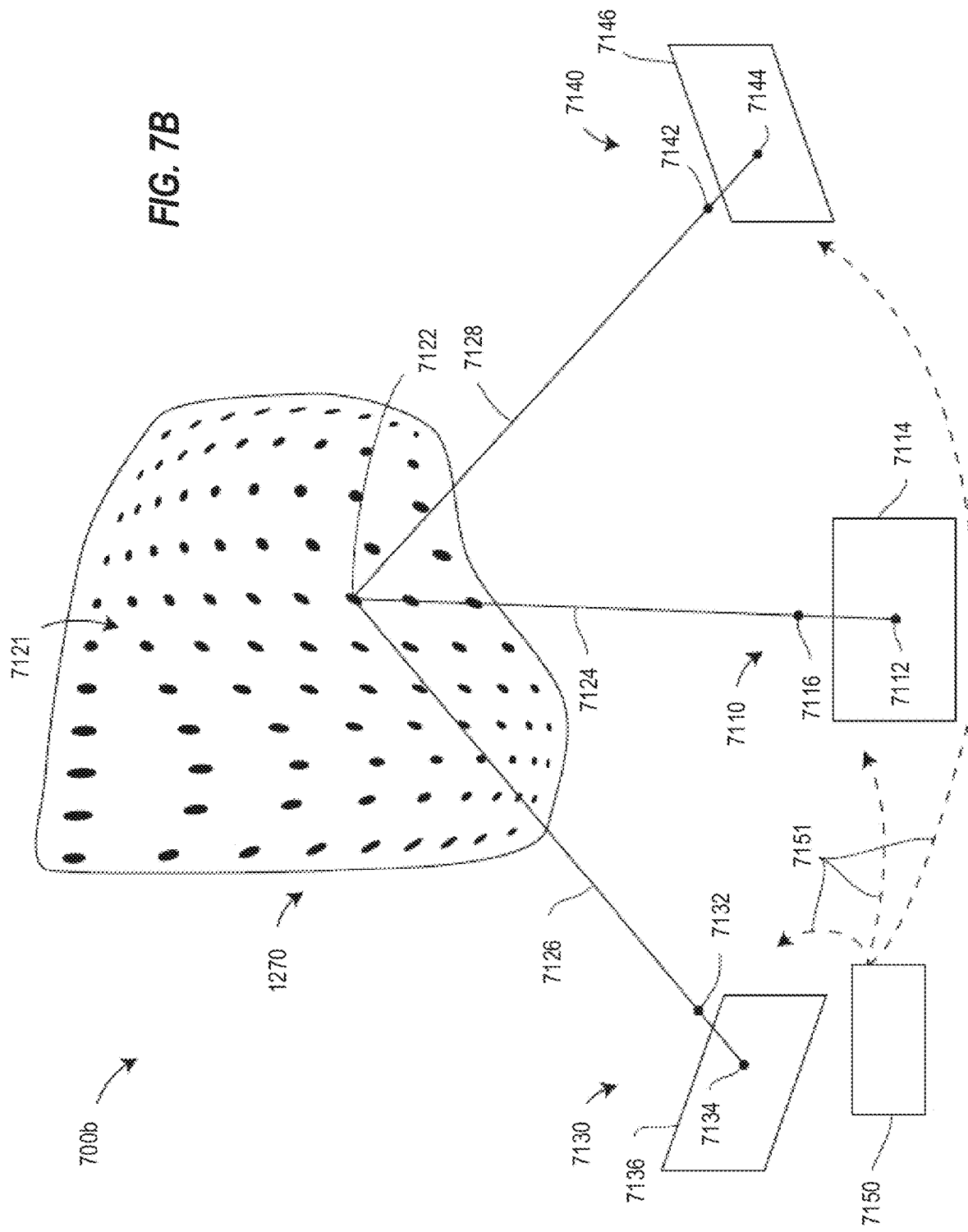
FIG. 7B is a schematic representation of a triangulation scanner having a projector that projects and uncoded pattern of uncoded spots, received by a first camera, and a second camera according to one or more embodiments described herein.
Figure 7C:
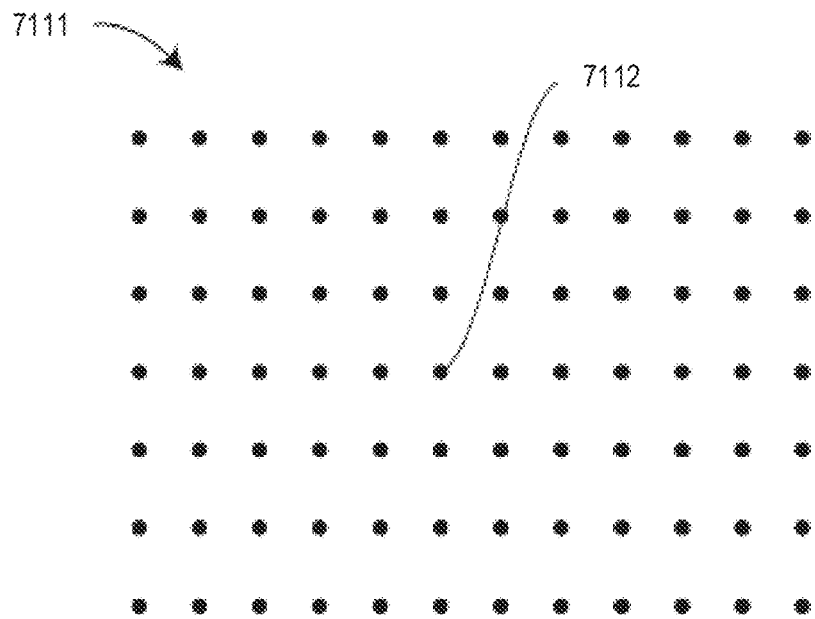
FIG. 7C is an example of an uncoded pattern of uncoded spots according to one or more embodiments described herein.
Figure 7D:
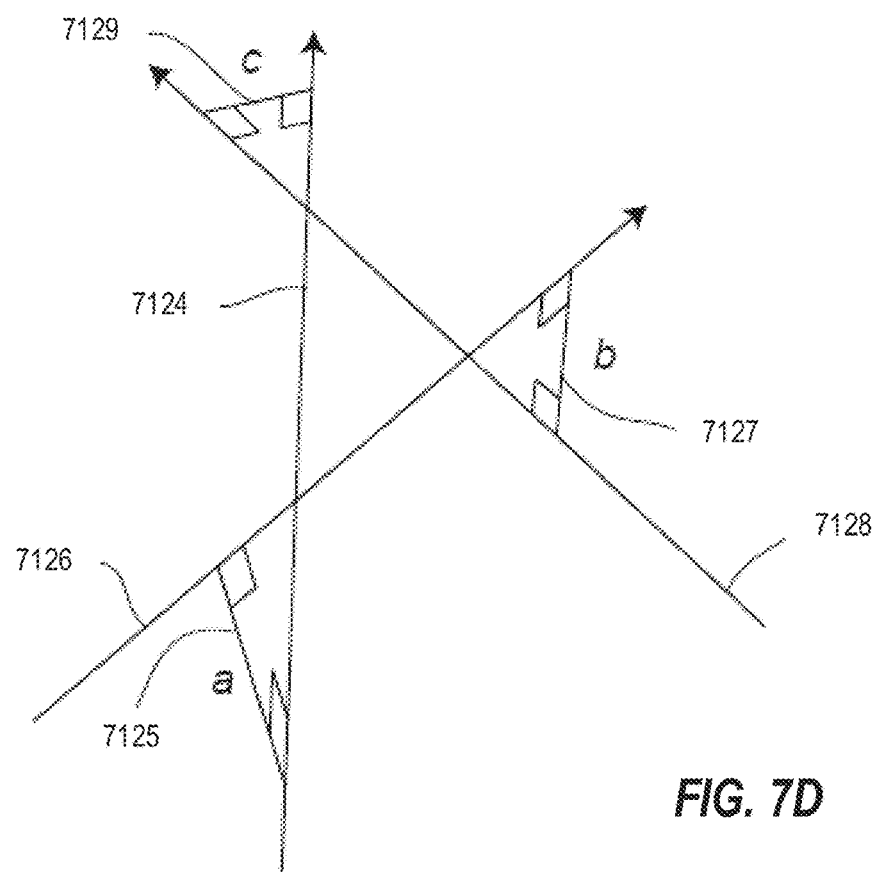
FIG. 7D is a representation of one mathematical method that might be used to determine a nearness of intersection of three lines according to one or more embodiments described herein.
Figure 7E:
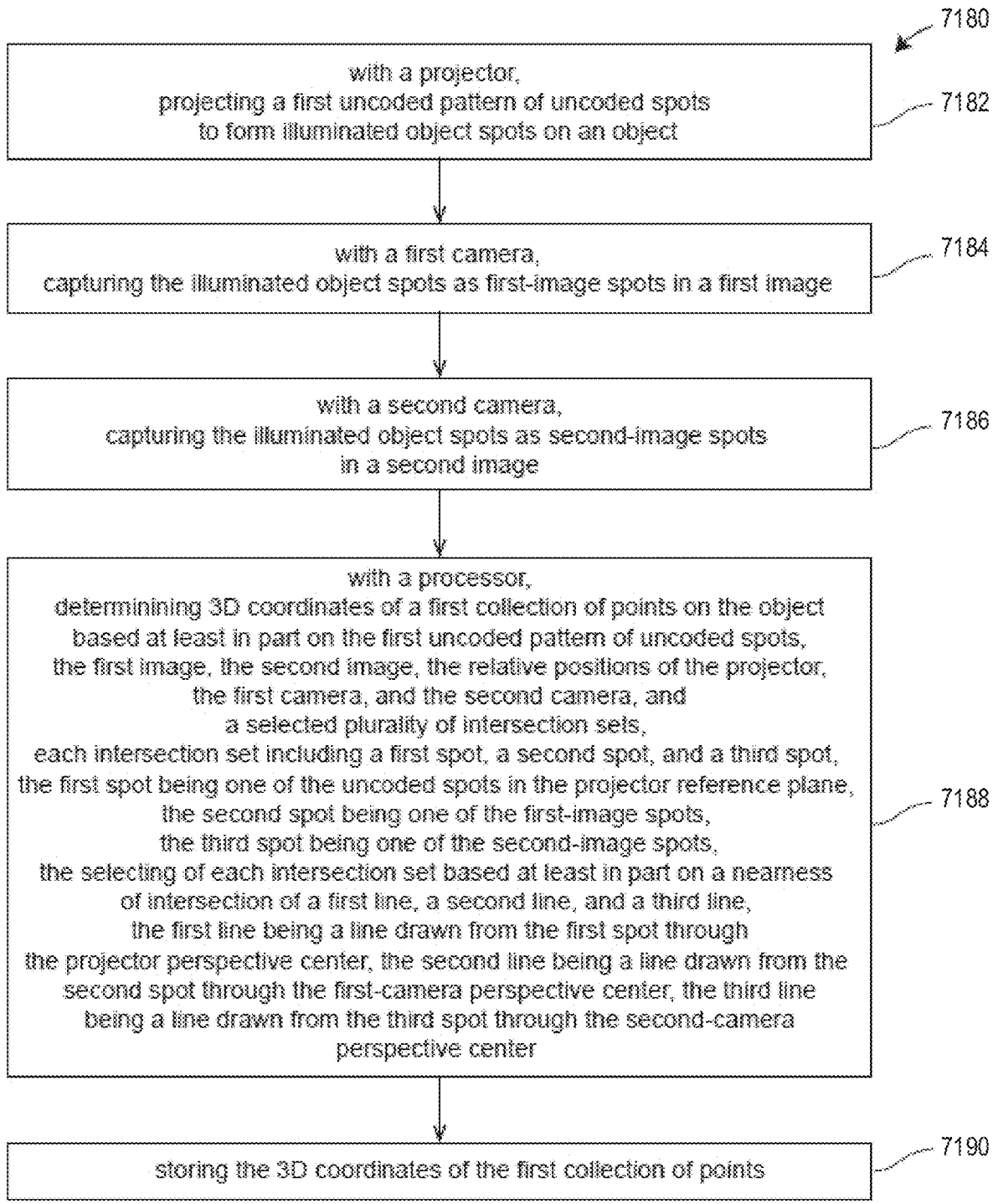
FIG. 7E is a list of elements in a method for determining 3D coordinates of an object according to one or more embodiments described herein.

FIG. 7E shows elements of a method 7180 for determining 3D coordinates of points on an object. An element 7182 includes projecting, with a projector, a first uncoded pattern of uncoded spots to form illuminated object spots on an object. FIGS. 7B, 7C illustrate this element 7182 using an embodiment 7100 in which a projector 7110 projects a first uncoded pattern of uncoded spots 7111 to form illuminated object spots 7121 on an object 1270.

A method element 7184 includes capturing with a first camera the illuminated object spots as first-image spots in a first image. This element is illustrated in FIG. 7B using an embodiment in which a first camera 7130 captures illuminated object spots 7121, including the first-image spot 7134, which is an image of the illuminated object spot 7122. A method element 7186 includes capturing with a second camera the illuminated object spots as second-image spots in a second image. This element is illustrated in FIG. 7B using an embodiment in which a second camera 7140 captures illuminated object spots 7121, including the second-image spot 7144, which is an image of the illuminated object spot 7122.

A first aspect of method element 7188 includes determining with a processor 3D coordinates of a first collection of points on the object based at least in part on the first uncoded pattern of uncoded spots, the first image, the second image, the relative positions of the projector, the first camera, and the second camera, and a selected plurality of intersection sets. This aspect of the element 7188 is illustrated in FIGS. 7B, 7C using an embodiment in which the processor 7150 determines the 3D coordinates of a first collection of points corresponding to object spots 7121 on the object 1270 based at least in the first uncoded pattern of uncoded spots 7111, the first image plane 7136, the second image plane 7146, the relative positions of the projector 7110, the first camera 7130, and the second camera 7140, and a selected plurality of intersection sets. An example from FIG. 7B of an intersection set is the set that includes the points 7112, 7134, and 7144. Any two of these three points may be used to perform a triangulation calculation to obtain 3D coordinates of the illuminated object spot 7122 as discussed herein above in reference to FIGS. 7A, 7B.

A second aspect of the method element 7188 includes selecting with the processor a plurality of intersection sets, each intersection set including a first spot, a second spot, and a third spot, the first spot being one of the uncoded spots in the projector reference plane, the second spot being one of the first-image spots, the third spot being one of the second-image spots, the selecting of each intersection set based at least in part on the nearness of intersection of a first line, a second line, and a third line, the first line being a line drawn from the first spot through the projector perspective center, the second line being a line drawn from the second spot through the first-camera perspective center, the third line being a line drawn from the third spot through the second-camera perspective center. This aspect of the element 7188 is illustrated in FIG. 7B using an embodiment in which one intersection set includes the first spot 7112, the second spot 7134, and the third spot 7144. In this embodiment, the first line is the line 7124, the second line is the line 7126, and the third line is the line 7128. The first line 7124 is drawn from the uncoded spot 7112 in the projector reference plane 7114 through the projector perspective center 7116. The second line 7126 is drawn from the first-image spot 7134 through the first-camera perspective center 7132. The third line 7128 is drawn from the second-image spot 7144 through the second-camera perspective center 7142. The processor 7150 selects intersection sets based at least in part on the nearness of intersection of the first line 7124, the second line 7126, and the third line 7128.

The processor 7150 may determine the nearness of intersection of the first line, the second line, and the third line based on any of a variety of criteria. For example, in an embodiment, the criterion for the nearness of intersection is based on a distance between a first 3D point and a second 3D point. In an embodiment, the first 3D point is found by performing a triangulation calculation using the first image spot 7134 and the second image spot 7144, with the baseline distance used in the triangulation calculation being the distance between the perspective centers 7132 and 7142. In the embodiment, the second 3D point is found by performing a triangulation calculation using the first image point 7134 and the exemplary uncoded spot 7112, with the baseline distance used in the triangulation calculation being the distance between the perspective centers 7134 and 7116. If the three lines 7124, 7126, and 7128 nearly intersect at the object spot 7122, then the calculation of the distance between the first 3D point and the second 3D point will result in a relatively small distance. On the other hand, a relatively large distance between the first 3D point and the second 3D would indicate that the points 7112, 7134, and 7144 did not all correspond to the object spot 7122.

As another example, in an embodiment, the criterion for the nearness of the intersection is based on a maximum of closest-approach distances between each of the three pairs of lines. This situation is illustrated in FIG. 7D. A line of closest approach 7125 is drawn between the lines 7124 and 7126. The line 7125 is perpendicular to each of the lines 7124, 7126 and has a nearness-of-intersection length a. A line of closest approach 7127 is drawn between the lines 7126 and 7128. The line 7127 is perpendicular to each of the lines 7126, 7128 and has length b. A line of closest approach 7129 is drawn between the lines 7124 and 7128. The line 7129 is perpendicular to each of the lines 7124, 7128 and has length c. According to the criterion described in the embodiment above, the value to be considered is the maximum of a, b, and c. A relatively small maximum value would indicate that points 7112, 7134, and 7144 have been correctly selected as corresponding to the illuminated object spot 7122. A relatively large maximum value would indicate that points 7112, 7134, and 7144 were incorrectly selected as corresponding to the illuminated object spot 7122.

The processor 7150 may use many other criteria to establish the nearness of intersection. For example, for the case in which the three lines were coplanar, a circle inscribed in a triangle formed from the intersecting lines would be expected to have a relatively small radius if the three points 7112, 7134, 7144 corresponded to the object spot 7122. For the case in which the three lines were not coplanar, a sphere having tangent points contacting the three lines would be expected to have a relatively small radius.

It should be noted that the selecting of intersection sets based at least in part on a nearness of intersection of the first line, the second line, and the third line is not used in most other projector-camera methods based on triangulation. For example, for the case in which the projected points are coded points, which is to say, recognizable as corresponding when compared on projection and image planes, there is no need to determine a nearness of intersection of the projected and imaged elements. Likewise, when a sequential method is used, such as the sequential projection of phase-shifted sinusoidal patterns, there is no need to determine the nearness of intersection as the correspondence among projected and imaged points is determined based on a pixel-by-pixel comparison of phase determined based on sequential readings of optical power projected by the projector and received by the camera(s). The method element 7190 includes storing 3D coordinates of the first collection of points.

Figure 8:
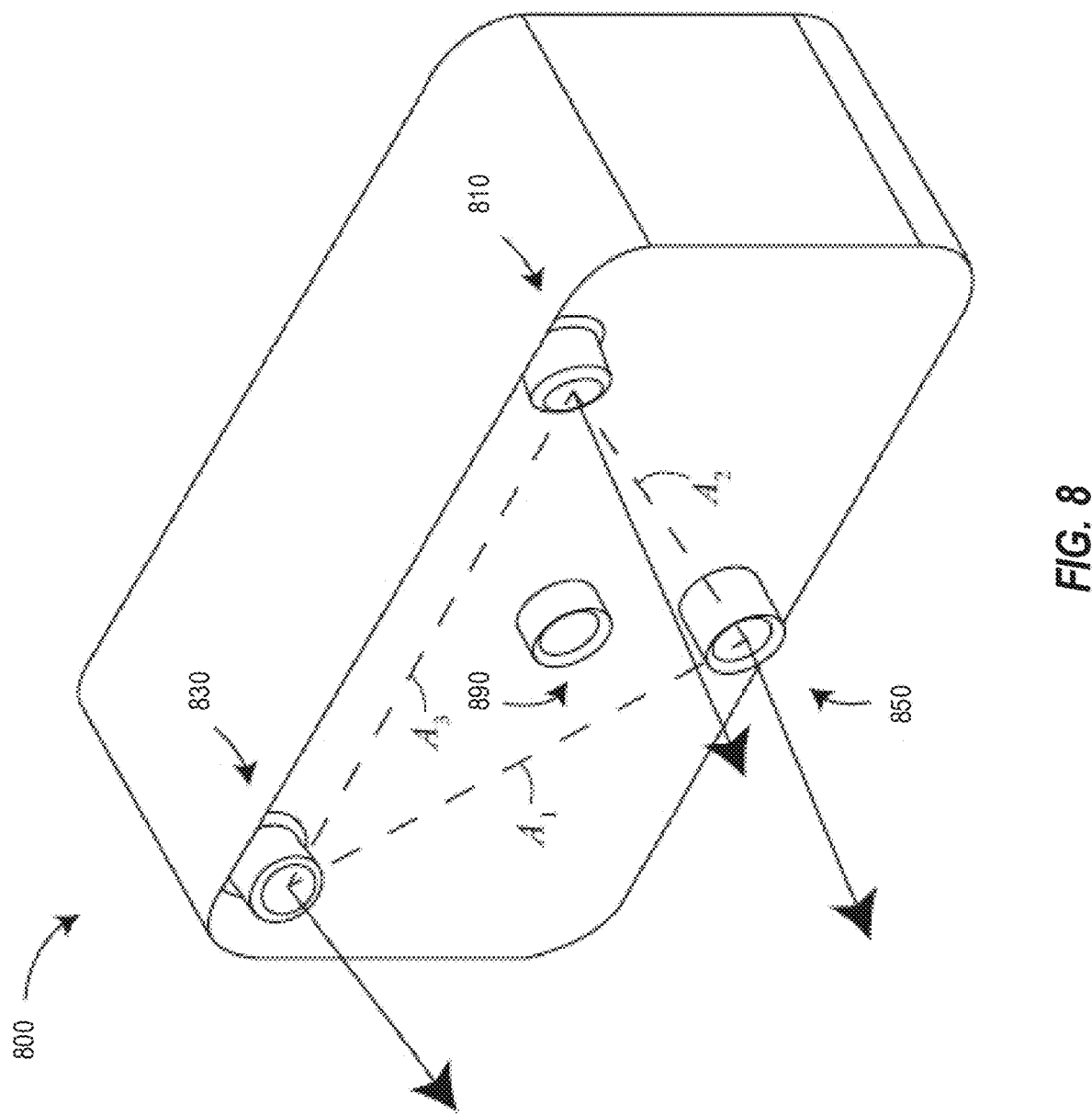
FIG. 8 is an isometric view of a triangulation scanner having a projector and two cameras arranged in a triangle according to one or more embodiments described herein.

An alternative method that uses the intersection of epipolar lines on epipolar planes to establish correspondence among uncoded points projected in an uncoded pattern is described in U.S. Pat. No. 9,599,455 ('455) to Heidemann, et al., the contents of which are incorporated by reference herein. In an embodiment of the method described in Patent '455, a triangulation scanner places a projector and two cameras in a triangular pattern. An example of a triangulation scanner 800 having such a triangular pattern is shown in FIG. 8. The triangulation scanner 800 includes a projector 850, a first camera 810, and a second camera 830 arranged in a triangle having sides A1-A2-A3. In an embodiment, the triangulation scanner 800 may further include an additional camera 1390 not used for triangulation but to assist in registration and colorization.

Figure 9:
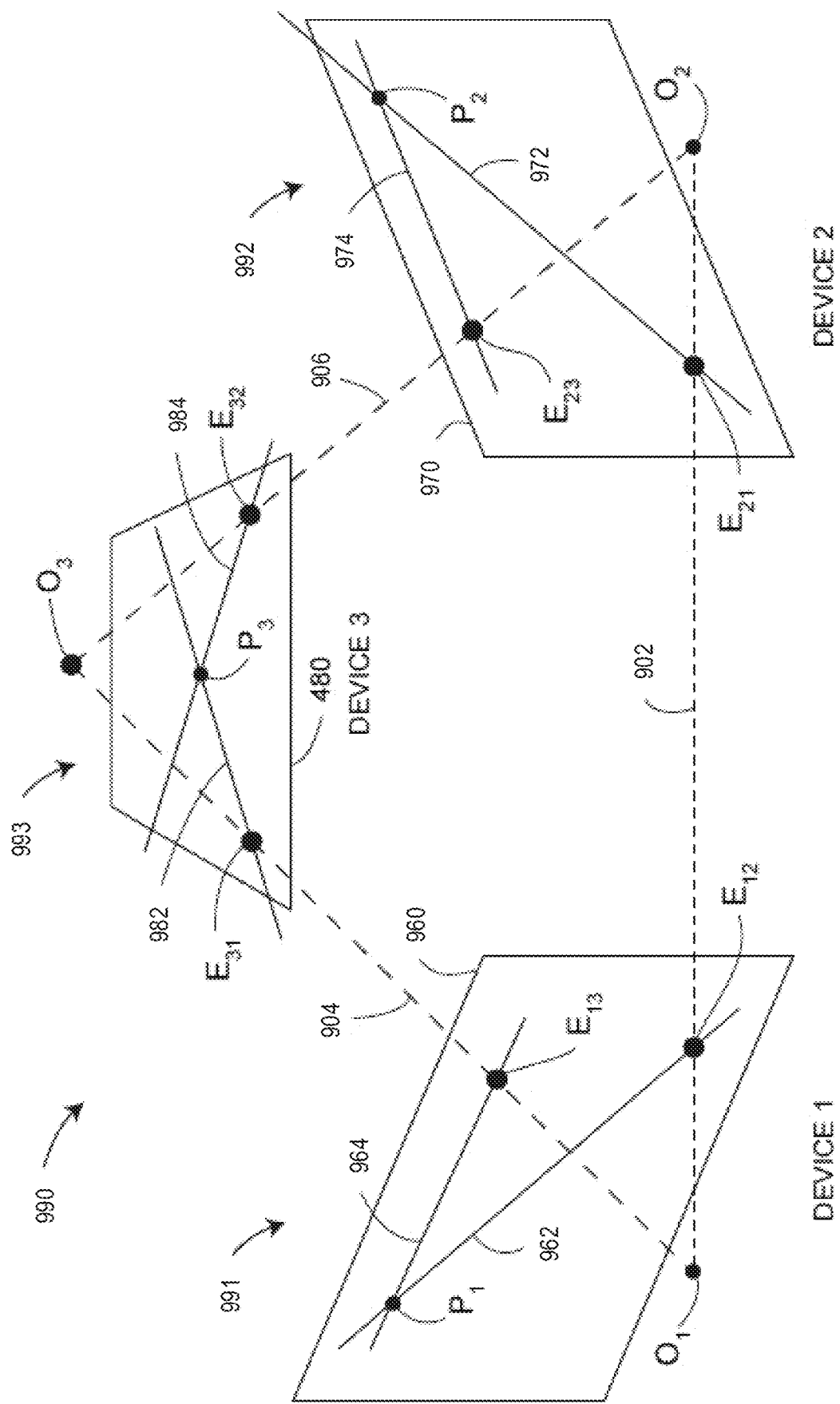
FIG. 9 is a schematic illustration of intersecting epipolar lines in epipolar planes for a combination of projectors and cameras according to one or more embodiments described herein.

Referring now to FIG. 9 the epipolar relationships for a 3D imager (triangulation scanner) 990 correspond with 3D imager 800 of FIG. 8 in which two cameras and one projector are arranged in the shape of a triangle having sides 902, 904, 906. In general, the device 1, device 2, and device 3 may be any combination of cameras and projectors as long as at least one of the devices is a camera. Each of the three devices 991, 992, 993 has a perspective center O1, O2, O3, respectively, and a reference plane 960, 970, and 980, respectively. In FIG. 9, the reference planes 960, 970, 980 are epipolar planes corresponding to physical planes such as an image plane of a photosensitive array or a projector plane of a projector pattern generator surface but with the planes projected to mathematically equivalent positions opposite the perspective centers O1, O2, O3. Each pair of devices has a pair of epipoles, which are points at which lines drawn between perspective centers intersect the epipolar planes. Device 1 and device 2 have epipoles E12, E21 on the planes 960, 970, respectively. Device 1 and device 3 have epipoles E-13, E31, respectively on the planes 960, 980, respectively. Device 2 and device 3 have epipoles E23, E32 on the planes 970, 980, respectively. In other words, each reference plane includes two epipoles. The reference plane for device 1 includes epipoles E12 and E13. The reference plane for device 2 includes epipoles E21 and E23. The reference plane for device 3 includes epipoles E31 and E32.

In an embodiment, the device 3 is a projector 993, the device 1 is a first camera 1491, and the device 2 is a second camera 992. Suppose that a projection point P3, a first image point P1, and a second image point P2 are obtained in a measurement. These results can be checked for consistency in the following way.

To check the consistency of the image point P1, intersect the plane P3-E31-E13 with the reference plane 960 to obtain the epipolar line 964. Intersect the plane P2-E21-E12 to obtain the epipolar line 962. If the image point P1 has been determined consistently, the observed image point P1 will lie on the intersection of the determined epipolar lines 962 and 964.

To check the consistency of the image point P2, intersect the plane P3-E32-E23 with the reference plane 970 to obtain the epipolar line 974. Intersect the plane P1-E12-E21 to obtain the epipolar line 972. If the image point P2 has been determined consistently, the observed image point P2 will lie on the intersection of the determined epipolar lines 972 and 974.

To check the consistency of the projection point P3, intersect the plane P2-E23-E32 with the reference plane 980 to obtain the epipolar line 984. Intersect the plane P1-E13-E31 to obtain the epipolar line 982. If the projection point P3 has been determined consistently, the projection point P3 will lie on the intersection of the determined epipolar lines 982 and 984.

It should be appreciated that since the geometric configuration of device 1, device 2 and device 3 are known, when the projector 993 emits a point of light onto a point on an object that is imaged by cameras 991, 992, the 3D coordinates of the point in the frame of reference of the 3D imager 990 may be determined using triangulation methods.

Note that the approach described herein above with respect to FIG. 9 may not be used to determine 3D coordinates of a point lying on a plane that includes the optical axes of device 1, device 2, and device 3 since the epipolar lines are degenerate (fall on top of one another) in this case. In other words, in this case, intersection of epipolar lines is no longer obtained. Instead, in an embodiment, determining self-consistency of the positions of an uncoded spot on the projection plane of the projector and the image planes of the first and second cameras is used to determine correspondence among uncoded spots, as described herein above in reference to FIGS. 7B, 7C, 7D, 7E.

FIGS. 10A, 10B, 10C, 10D, 10E are schematic illustrations of alternative embodiments of the projector 620. In FIG. 10A, a projector 1000 includes a light source, mirror 1004, and diffractive optical element (DOE) 1006. The light source 1002 may be a laser, a superluminescent diode, or a partially coherent LED, for example. The light source 1002 emits a beam of light 1010 that reflects off mirror 1004 and passes through the DOE. In an embodiment, the DOE 1006 produces an array of diverging and uniformly distributed light spots 1012. In FIG. 10B, a projector 1020 includes the light source 1002, mirror 1004, and DOE 1006 as in FIG. 10A. However, in the projector 1020 of FIG. 10B, the mirror 1004 is attached to an actuator 1022 that causes rotation 1024 or some other motion (such as translation) in the mirror. In response to the rotation 1024, the reflected beam off the mirror 1004 is redirected or steered to a new position before reaching the DOE 1006 and producing the collection of light spots 1012. In system 1030 of FIG. 10C, the actuator is applied to a mirror 1032 that redirects the beam 1012 into a beam 1036. Other types of steering mechanisms such as those that employ mechanical, optical, or electro-optical mechanisms may alternatively be employed in the systems of FIGS. 10A, 10B, 10C. In other embodiments, the light passes first through the diffractive optical element (DOE) 1006 and then through the mirror 1004 or is directed towards the object space without a mirror 1004.

In the system 1040 of FIG. 10D, an electrical signal is provided by the electronics 1044 to drive a projector pattern generator 1042, which may be a pixel display such as a Liquid Crystal on Silicon (LCoS) display to serve as a pattern generator unit, for example. The light 1045 from the LCoS display 1042 is directed through the perspective center 1047 from which it emerges as a diverging collection of uncoded spots 1048. In system 1050 of FIG. 10E, a source is light 1052 may emit light that may be sent through or reflected off of a pattern generating unit 1054. In an embodiment, the source of light 1052 sends light to a digital micromirror device (DMD), which reflects the light 1055 through a lens 1056. In an embodiment, the light is directed through a perspective center 1057 from which it emerges as a diverging collection of uncoded spots 1058 in an uncoded pattern. In another embodiment, the source of light 1062 passes through a slide 1054 having an uncoded pattern of dots before passing through a lens 1056 and proceeding as an uncoded pattern of light 1058. In another embodiment, the light from the light source 1052 passes through a lenslet array 1054 before being redirected into the pattern 1058. In this case, inclusion of the lens 1056 is optional.

The actuators 1022, 1034, also referred to as beam steering mechanisms, may be any of several types such as a piezo actuator, a microelectromechanical system (MEMS) device, a magnetic coil, or a solid-state deflector.

Figure 11A:
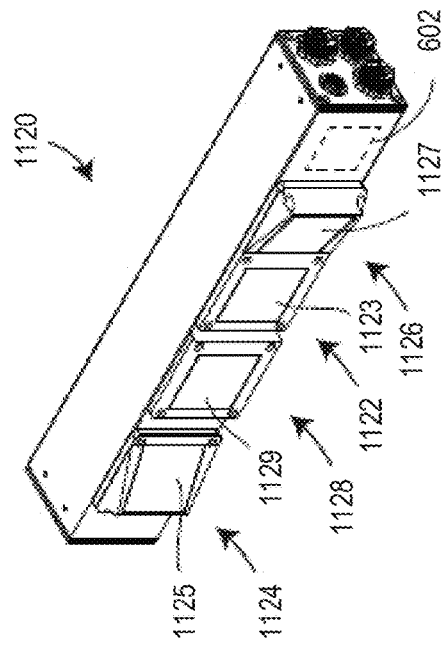
FIG. 11A is an isometric view of a triangulation scanner having two projectors and one camera according to one or more embodiments described herein.

FIG. 11A is an isometric view of a triangulation scanner 1100 that includes a single camera 1102 and two projectors 1104, 1106, these having windows 1103, 1105, 1107, respectively. In the triangulation scanner 1100, the projected uncoded spots by the projectors 1104, 1106 are distinguished by the camera 1102. This may be the result of a difference in a characteristic in the uncoded projected spots. For example, the spots projected by the projector 1104 may be a different color than the spots projected by the projector 1106 if the camera 1102 is a color camera. In another embodiment, the triangulation scanner 1100 and the object under test are stationary during a measurement, which enables images projected by the projectors 1104, 1106 to be collected sequentially by the camera 1102. The methods of determining correspondence among uncoded spots and afterwards in determining 3D coordinates are the same as those described earlier in FIG. 12 for the case of two cameras and one projector. In an embodiment, the triangulation scanner 1100 includes a processor 602 that carries out computational tasks such as determining correspondence among uncoded spots in projected and image planes and in determining 3D coordinates of the projected spots.

Figure 11B:
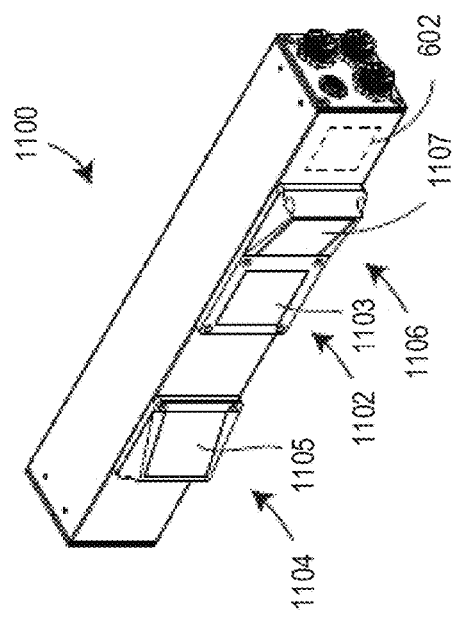
FIG. 11B is an isometric view of a triangulation scanner having three cameras and one projector according to one or more embodiments described herein.

FIG. 11B is an isometric view of a triangulation scanner 1120 that includes a projector 1122 and in addition includes three cameras: a first camera 1124, a second camera 1126, and a third camera 1128. These aforementioned projector and cameras are covered by windows 1123, 1125, 1127, 1129, respectively. In the case of a triangulation scanner having three cameras and one projector, it is possible to determine the 3D coordinates of projected spots of uncoded light without knowing in advance the pattern of dots emitted from the projector. In this case, lines can be drawn from an uncoded spot on an object through the perspective center of each of the three cameras. The drawn lines may each intersect with an uncoded spot on each of the three cameras.

Triangulation calculations can then be performed to determine the 3D coordinates of points on the object surface. In an embodiment, the triangulation scanner 1120 includes the processor 602 that carries out operational methods such as verifying correspondence among uncoded spots in three image planes and in determining 3D coordinates of projected spots on the object.

Figure 11C:
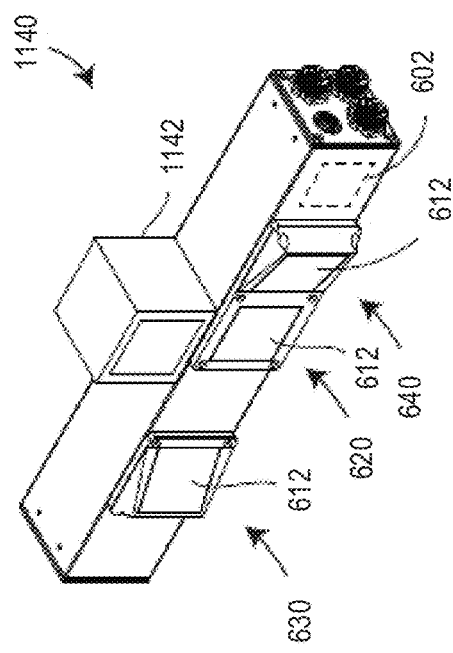
FIG. 11C is an isometric view of a triangulation scanner having one projector and two cameras and further including a camera to assist in registration or colorization according to one or more embodiments described herein.

FIG. 11C is an isometric view of a triangulation scanner 1140 like that of FIG. 1A except that it further includes a camera 1142, which is coupled to the triangulation scanner 1140. In an embodiment the camera 1142 is a color camera that provides colorization to the captured 3D image. In a further embodiment, the camera 1142 assists in registration when the camera 1142 is moved—for example, when moved by an operator or by a robot.

Figure 12A:
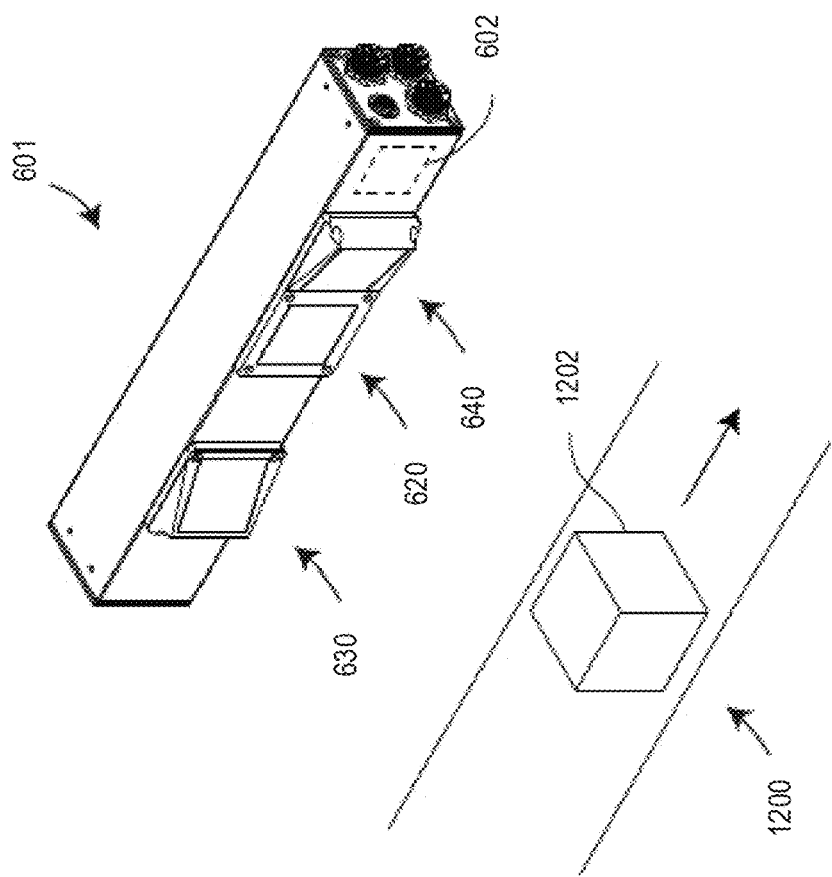
FIG. 12A illustrates a triangulation scanner used to measure an object moving on a conveyor belt according to one or more embodiments described herein.

FIGS. 12A, 12B illustrate two different embodiments for using the triangulation scanner 1 in an automated environment. FIG. 12A illustrates an embodiment in which a scanner 1 is fixed in position and an object under test 1702 is moved, such as on a conveyor belt 1700 or other transport device. The scanner 1 obtains 3D coordinates for the object 1702. In an embodiment, a processor, either internal or external to the scanner 1, further determines whether the object 1702 meets its dimensional specifications. In some embodiments, the scanner 1 is fixed in place, such as in a factory or factory cell for example, and used to monitor activities. In one embodiment, the processor 602 monitors whether there is risk of contact with humans from moving equipment in a factory environment and, in response, issue warnings, alarms, or cause equipment to stop moving.

FIG. 12B illustrates an embodiment in which a triangulation scanner 1 is attached to a robot end effector 1210, which may include a mounting plate 1212 and robot arm 1214. The robot may be moved to measure dimensional characteristics of one or more objects under test. In further embodiments, the robot end effector is replaced by another type of moving structure. For example, the triangulation scanner 601 may be mounted on a moving portion of a machine tool.

Figure 13:
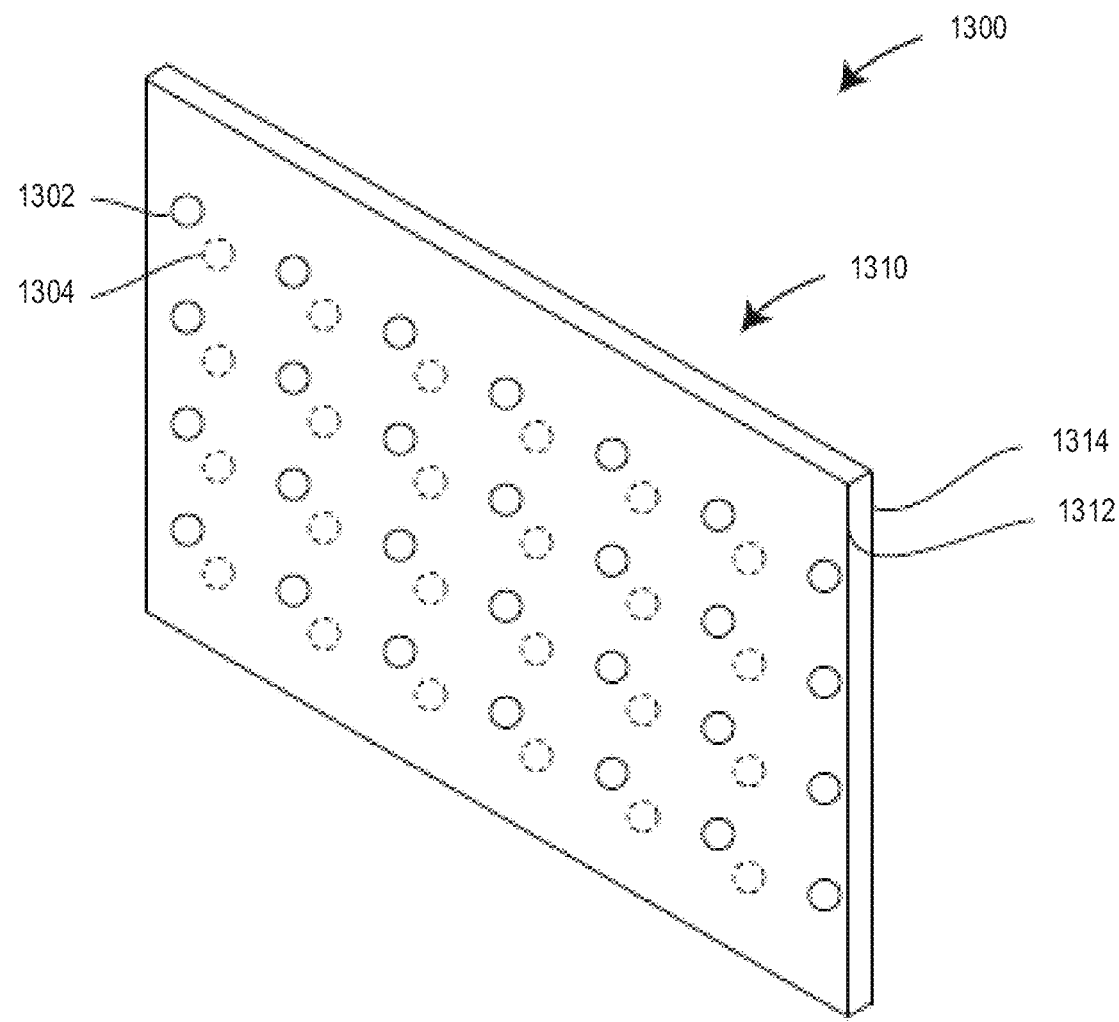
FIG. 13 illustrates front and back reflections off a relatively transparent material such as glass according to one or more embodiments described herein.

FIG. 13 is a schematic isometric drawing of a measurement application 1300 that may be suited to the triangulation scanners described herein above. In an embodiment, a triangulation scanner 601 sends uncoded spots of light onto a sheet of translucent or nearly transparent material 1310 such as glass. The uncoded spots of light 1302 on the glass front surface 1312 arrive at an angle to a normal vector of the glass front surface 1312. Part of the optical power in the uncoded spots of light 1302 pass through the front surface 1312, are reflected off the back surface 1314 of the glass, and arrive a second time at the front surface 1312 to produce reflected spots of light 1304, represented in FIG. 13 as dashed circles. Because the uncoded spots of light 1302 arrive at an angle with respect to a normal of the front surface 1312, the spots of light 1304 are shifted laterally with respect to the spots of light 1302. If the reflectance of the glass surfaces is relatively high, multiple reflections between the front and back glass surfaces may be picked up by the triangulation scanner 1.

The uncoded spots of lights 1302 at the front surface 1312 satisfy the criterion described with respect to FIG. 7 in being intersected by lines drawn through perspective centers of the projector and two cameras of the scanner. For example, consider the case in which in FIG. 7 the element 750 is a projector, the elements 710, 730 are cameras, and the object surface 770 represents the glass front surface 770. In FIG. 7, the projector 750 sends light from a point 753 through the perspective center 758 onto the object 770 at the position 772. Let the point 753 represent the center of a spot of light 1302 in FIG. 13. The object point 772 passes through the perspective center 718 of the first camera onto the first image point 720. It also passes through the perspective center 738 of the second camera 730 onto the second image point 735. The image points 700, 735 represent points at the center of the uncoded spots 1302. By this method, the correspondence in the projector and two cameras is confirmed for an uncoded spot 1302 on the glass front surface 1312. However, for the spots of light 1304 on the front surface that first reflect off the back surface, there is no projector spot that corresponds to the imaged spots. In other words, in the representation of FIG. 7, there is no condition in which the lines 711, 731, 751 intersect in a single point 772 for the reflected spot 704. Hence, using this method, the spots at the front surface may be distinguished from the spots at the back surface, which is to say that the 3D coordinates of the front surface are determined without contamination by reflections from the back surface. This is possible as long as the thickness of the glass is large enough and the glass is tilted enough relative to normal incidence. Separation of points reflected off front and back glass surfaces is further enhanced by a relatively wide spacing of uncoded spots in the projected uncoded pattern as illustrated in FIG. 13. Although the method of FIG. 13 was described with respect to the scanner 1, the method would work equally well for other scanner embodiments such as the scanners 1100, 1120, 1140 of FIGS. 11A, 11B, 11C, respectively.

Terms such as processor, controller, computer, DSP, FPGA are understood in this document to mean a computing device that may be located within an instrument, distributed in multiple elements throughout an instrument, or placed external to an instrument.

While embodiments of the invention have been described in detail in connection with only a limited number of embodiments, it should be readily understood that the invention is not limited to such disclosed embodiments. Rather, the embodiments of the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the embodiments of the invention are not to be seen as limited by the foregoing description but is only limited by the scope of the appended claims.

What is claimed is:

1. A method, comprising:
    training a neural network to identify a deformity associated with an object;
    aligning, by a processing device, a measurement point cloud for an object with reference data for the object;
    determining, by the processing device using the neural network, a deviation associated with the object;
    wherein the measurement point cloud is a three-dimensional (3D) point cloud;
    transforming, by the processing device, the 3D point cloud into a 2.5-dimensional (2.5D) matrix; and
    performing evaluations of the 2.5D matrix using the neural network on-the-fly during scanning of the object as the points of the 3D point cloud are received and processed by the processing device to identify the deviation associated with the object based on how the object is normally without the deviation.

2. The method of claim 1, wherein the aligning of the reference data with the measurement point cloud is based on a feature or a marker within the reference data.

3. The method of claim 1, further comprising:
evaluating, by the processing device, normals of each point of the measurement point cloud and generalizing each point to vector fields.

4. The method of claim 1, further comprising:
acquiring, using a three-dimensional scanner, the measurement point cloud.

5. The method of claim 1, wherein the reference data is a reference point cloud.

6. The method of claim 1, wherein the reference data is a computer-aided design model.

7. The method of claim 1, wherein the reference data is scan data of a scanned golden part.

8. The method of claim 7, further comprising:
comparing, by the processing device, the measurement point cloud to the reference data to determine a displacement value between each point in the measurement point cloud and a corresponding point in the reference data; and
generating, by the processing device, a deviation histogram of the displacement values between each point in the measurement point cloud and the corresponding point in the reference data;
wherein the deviation associated with the object is determined by the processing device using the neural network based at least in part on the deviation histogram;
wherein performing the comparison comprises performing a multi-scale model-to-model cloud comparison.

9. The method of claim 1, further comprising:
classifying, by the processing device using the neural network, a type of the deviation associated with the object.

10. The method of claim 1, wherein the reference data is a three-dimensional (3D) point cloud.

11. The method of claim 1, wherein the reference data is a two-dimensional (2D) image of a 3D point cloud.

12. The method of claim 1, wherein performing the evaluations of the 2.5D matrix using the neural network on-the-fly during the scanning of the object as the points of the 3D point cloud are received and processed by the processing device to identify the deviation associated with the object is further based on an opacity value associated with the 2.5D matrix.

13. The method of claim 1, further comprising:
identifying, by the processing device using the neural network, an entropy rate based on the 2.5D matrix;
wherein the at least one of the deviation associated with the object and the anomaly associated with the object is determined based on the entropy rate that is determined based on the 2.5D matrix by the processing device using the neural network.

14. The method of claim 1, wherein the 3D point cloud is transformed into the 2.5D matrix by the processing device based on a virtual camera having a position, an orientation, a focal length, and a field of view tuned to view a feature of interest of the object.

15. The method of claim 1, wherein transforming, by the processing device, the 3D point cloud into the 2.5-dimensional (2.5D) matrix comprises:
selecting at least one orientation of the 3D point cloud so that a feature of interest is visible from a fixed vertical viewpoint;
projecting the 3D point cloud to a virtual camera located at the fixed vertical viewpoint;
tracking a distance of a projected point to the virtual camera;
filtering projected points using the distance so that visible points remain in a virtual image; and
rastering the virtual image to form the 2.5D matrix.

16. The method of claim 1, further comprising:
comparing, by the processing device, the measurement point cloud to the reference data to determine a displacement value between each point in the measurement point cloud and a corresponding point in the reference data; and
generating, by the processing device, a deviation histogram of the displacement values between each point in the measurement point cloud and the corresponding point in the reference data;
wherein at least one of the deviation associated with the object and an anomaly of the object is determined by the processing device using the neural network based at least in part on the deviation histogram.

17. The method of claim 16, further comprising:
generating, by the processing device, a colored point cloud based at least in part on the deviation histogram.

18. The method of claim 17, wherein determining of the at least one of the deviation and the anomaly is based at least in part on the colored point cloud.

19. The method of claim 17, wherein determining of the at least one of the deviation and the anomaly is based at least in part on red-blue-green values.

20. The method of claim 18, wherein determining of the at least one of the deviation and the anomaly comprises identifying, by the processing device using the neural network, a problem region in the measurement point cloud.

* * * * *